United States Patent
Kanzaki et al.

(10) Patent No.: US 6,777,497 B2
(45) Date of Patent: Aug. 17, 2004

(54) POLYPROPYLENE-BASED RESIN COMPOSITION, PROCESS FOR PRODUCING THE SAME AND INJECTION MOLDED ARTICLE

(75) Inventors: Susumu Kanzaki, Kisarazu (JP); Mitsuji Tsuji, Ichihara (JP); Kazuki Wakamatsu, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/087,810

(22) Filed: Mar. 5, 2002

(65) Prior Publication Data

US 2003/0055172 A1 Mar. 20, 2003

(30) Foreign Application Priority Data

Mar. 7, 2001 (JP) ........................................ 2001-063020

(51) Int. Cl.$^7$ .................... C08L 23/00; C08L 23/04; C08L 27/00
(52) U.S. Cl. ........................................ 525/191; 525/240
(58) Field of Search .................. 525/191, 240

(56) References Cited

U.S. PATENT DOCUMENTS 6,110,986 A * 8/2000 Nozawa et al. ............. 521/143
6,251,997 B1 6/2001 Imai et al.
6,306,973 B1 10/2001 Takaoka et al.
6,320,009 B1 11/2001 Nakano et al.
6,518,363 B2 * 2/2003 Kanzaki et al. ............. 525/240

FOREIGN PATENT DOCUMENTS

| EP | 0 661 341 A1 | 7/1995 |
| JP | 7-157626 A | 6/1995 |
| JP | 7-157627 A | 6/1995 |
| JP | 7-286075 A | 10/1995 |

* cited by examiner

Primary Examiner—Nathan M. Nutter
(74) Attorney, Agent, or Firm—Sughrue Mion, PLLC

(57) ABSTRACT

A polypropylene-based resin composition comprising 0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C., 90 to 99.5% by weight of a propylene-based polymer component (A2) obtained by polymerizing a monomer mainly composed of propylene, intrinsic viscosity $[\eta]^2$ measured in tetralin at 135° C. of less than 5 dl/g.

14 Claims, No Drawings

POLYPROPYLENE-BASED RESIN COMPOSITION, PROCESS FOR PRODUCING THE SAME AND INJECTION MOLDED ARTICLE

BACKGROUND OF THE INVENTION

1. Field of the Invention

The present invention relates to a polypropylene-based resin composition, a process for producing the same and an injection molded article made of the same. More particularly, the present invention relates to a polypropylene-based resin composition which, when made into a molded article, has a low generation of flow marks, namely, a high die swell, and excellent appearance such as little generation of granular structures (fish eyes), and is excellent in balance of rigidity and toughness; a process for producing the same and an injection molded article made of the same.

2. Description of Related Arts

Polypropylene-based resin compositions are materials excellent in rigidity, impact resistance and the like, and are utilized in applications as molded articles such as automobile interiors and exterior materials, electric appliance housings and the like. It is conventionally well known that, among these polypropylene-based resin compositions, polypropylene-based resin compositions containing a propylene-ethylene block copolymer, for example, polypropylene-based resin compositions composed of a propylene-ethylene block copolymer and a propylene homopolymer, or of different two or more propylene-ethylene block copolymers, are excellent in rigidity, impact resistance and the like.

For example, JP07-157626A discloses a thermoplastic resin composition containing a propylene-ethylene block copolymer composed of a propylene homopolymer phase and a propylene-ethylene copolymer phase obtained by multi-stage polymerization, and polyolefin rubber. The propylene-ethylene block copolymer is composed of a propylene-ethylene random copolymer phase (i) having an ethylene content of from 5 to 50% by weight and an intrinsic viscosity of from 4.0 to 8.0 dl/g, and a propylene-ethylene block copolymer phase (ii) having an ethylene content of over 50% by weight and 98% by weight or less and an intrinsic viscosity of 2.0 dl/g or more and less than 4.0 dl/g, and it is disclosed that a thermoplastic resin composition having an extremely high ductility is obtained.

JP07-157627A discloses a thermoplastic resin composition containing a propylene-ethylene block copolymer obtained by multi-stage polymerization and polyolefin-based rubber. The propylene-ethylene block copolymer is composed of a propylene-ethylene block copolymer in which the propylene-ethylene random copolymer phase (iii) has an intrinsic viscosity of from 4.0 to 8.0 dl/g, and a propylene-ethylene block copolymer in which the propylene-ethylene block copolymer phase (iv) has an intrinsic viscosity of 2.0 dl/g or more and less than 4.0 dl/g, (excluding a propylene-ethylene block copolymer having a propylene-ethylene random copolymer phase having an intrinsic viscosity of from 4.0 to 8.0 dl/g and an ethylene content of from 5 to 50% by weight and a propylene-ethylene block copolymer having a propylene-ethylene random copolymer phase having an intrinsic viscosity of 2.0 dl/g or more and less than 4.0 dl/g and an ethylene content of over 50% by weight and 98% by weight or less), and it is disclosed that the thermoplastic resin composition having extremely high ductility is obtained.

JP07-233305A discloses a polypropylene resin composition having an improved melt index, composed of a polypropylene, a inorganic filler and a metal soap of a zinc salt of a fatty acid having 15 to 20 carbon atoms. As the polypropylene, block copolymers containing a propylene-ethylene copolymer part having a [η] of 2 to 6 dl/g and a propylene-ethylene copolymer part having a [η] of 7 to 15 dl/g are described, and as a preferable embodiment, those composed of at least two kinds of block copolymers are described. Further, it is described that a polypropylene resin composition manifesting no problematical lowering in impact strength, rigidity, heat resistance or the like, having improved flowability and suitable for producing a molded article thinned in thickness, and showing little discoloration to yellow or pink caused by pelletizing and little bleeding of low molecular weight compounds on the surface of a mold and the surface of an injection molded article, is obtained.

In addition, a propylene-ethylene block copolymer used due to excellent rigidity, impact resistance and the like is recently produced by a continuous gas phase polymerization method because of a simple production process and production at low cost. However, the propylene-ethylene block copolymer produced by the gas phase method generally has problems of poor appearance as a molded article due to generation of granular structures when the intrinsic viscosity of a propylene-ethylene random copolymer portion is set at a high level.

For solving such problems on appearance, for example, JP07-286075A discloses a propylene polymer composition composed of a propylene polymer produced by a continuous polymerization method in which the 23° C. n-decane-soluble component content is 0% by weight or more and less than 15% by weight and the 23° C. n-decane-soluble component contains a structural unit derived from ethylene in an amount of 30 to 60 mol % and has an intrinsic viscosity [η] of 3 to 7 dl/g, and a propylene block copolymer produced by a batch-wise solvent polymerization method or continuous solvent polymerization method in which the 23° C. n-decane-soluble component content is 15 to 40% by weight and this 23° C. n-decane-soluble component contains a structural unit derived from ethylene in an amount of 30 to 60 mol % and has an intrinsic viscosity [η] of 5 to 12 dl/g, and it is described that a propylene polymer composition having excellent rigidity and impact resistance and capable of forming a molded article without generating granular structures on appearance is obtained, however, there is desired a further improvement regarding generation of granular structures. On the other hand, WO98/54233 discloses a polypropylene resin composition in which the content of a high molecular weight polypropylene having an intrinsic viscosity [η] of 9 to 13 dl/g is from 15 to 30% by weight, the molecular weight distribution represented by Mw/Mn is 20 or more, the molecular weight distribution represented by Mz/Mw is 7 or more, and when molded into an injection molded article, the thickness of a skin layer formed on the surface of this injection molded article is 300 μm or more. The described polypropylene resin composition has light weight, has extremely high rigidity and heat resistance and manifests excellent flowability in molding and excellent processability.

However, it is described in, for example, Plastics Age, May, 1980, p. 93, FIG. 2. 27 that when the thickness of a skin layer formed on the surface of an injection molded article increases, ultimate elongation (tensile elongation), namely, toughness lowers, and there is a desire for an improvement of balance between rigidity and toughness regarding the above-mentioned polypropylene resin composition described in WO98/54233.

JP2000-226478A describes a polypropylene resin composition having a molecular weight distribution represented by Mw/Mn of 8 or more and containing a high molecular weight polypropylene having an intrinsic viscosity [η] of 6 to 11 dl/g and a low molecular weight polypropylene having an intrinsic viscosity [η] of 0.6 to 1.6 dl/g. A polypropylene resin composition is described which has light weight, has extremely high rigidity and heat resistance, and shows excellent flowability in molding, generates no cracking in molding and has excellent moldability. However, since the ultimate elongation of the above-mentioned polypropylene resin composition described in an example of JP-A No. 2000-226478 is from 8 to 16%, there is desired an improvement in the balance between rigidity and toughness.

As described above, there is a desire for the development of a polypropylene-based resin composition which, when molded into a molded article, manifests a low tendency of generation of flow mark on the surface of the molded article, namely, has excellent appearance properties such as high die swell and practically no-problematical generation of granular structures, and is excellent in balance between rigidity and toughness.

SUMMARY OF THE INVENTION

An object of the present invention is to provide a polypropylene-based resin composition which, when molded into a molded article, manifests a low tendency of generation of flow marks, namely has a high die swell, has excellent appearance such as little generation of granular structures, and the like, and is excellent in balance between rigidity and toughness, to a process for producing the same, and to an injection molded article made of the same.

Namely, the present invention relates to a polypropylene-based resin composition comprising 0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter (herein-after, referred to as "DSC".) of 130 to 160° C., and 90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, a process for producing the same and an injection molded article made of the same.

The present invention will be described in detail below.

DETAILED DESCRIPTION OF THE INVENTION

The propylene-based polymer component (A1) used in the present invention is a propylene-based polymer obtained by polymerizing a monomer mainly composed of propylene. Examples thereof include a propylene homopolymer obtained by homo-polymerization of propylene, a propylene- ethylene random copolymer obtained by copolymerization of propylene and ethylene, a propylene-α-olefin random copolymer obtained by copolymerization of propylene and an α-olefin having 4 to 12 carbon atoms, and the like. (A1 is preferably a propylene-ethylene random copolymer.

The ethylene content in the propylene-ethylene random copolymer is usually from 0.5 to 8% by weight, preferably from 1 to 7% by weight.

As the α-olefin having 4 to 12 carbon atoms used in a propylene-α-olefin random copolymer, butene-1, pentene-1, hexene-1, 4-methylpentene-1, octane-1, decene-1 and the like are listed, and preferably is butene-1.

The content of the α-olefin is usually from 1 to 20% by weight, preferably from 2 to 15% by weight.

As the propylene-α-olefin random copolymer, for example, a propylene-butene-1 random copolymer, propylene-hexene-1 random copolymer and the like are listed, and preferably is a propylene-butene-1 random copolymer.

The intrinsic viscosity $[\eta]^{A1}$ measured in tetralin at 135° C. of the propylene-based polymer component (A1) used in the present invention is 5 dl/g or more, preferably 6 dl/g or more, and from the standpoint of dispersibility of the component (A1), further preferably 6 to 9 dl/g. When the intrinsic viscosity $[\eta]^{A1}$ is less than 5 dl/g, high die swell is not obtained, and prevention of generation of flow mark may be insufficient in some cases.

The melting peak temperature $Tm^{A1}$ measured by a DSC of the propylene-based polymer component (A1) used in the present invention is from 130 to 160° C., preferably from 135 to 155° C.

Herein, the melting peak temperature $Tm^{A1}$ is determined from a temperature-rising thermogram of the component (A1) obtained by using a DSC. When $Tm^{A1}$ is less than 130° C., high rigidity may not be obtained, and when over 160° C., sufficient tensile elongation may not be obtained. Due to insufficient dispersion of the component (A1), a lot of granular structure may be formed.

The propylene-based polymer component (A2) used in the present invention is a propylene-based polymer obtained by polymerizing a monomer mainly composed of propylene, and specific examples thereof include a propylene homopolymer obtained by homo-polymerization of propylene, a propylene-ethylene random copolymer obtained by copolymerization of propylene and ethylene, a propylene-α-olefin random copolymer obtained by copolymerization of propylene and an α-olefin having 4 to 12 carbon atoms, a propylene-ethylene block copolymer and the like, and also as theα-olefin having 4 to 12 carbon atoms, the same compounds as listed above are mentioned.

The intrinsic viscosity $[\eta]^{A2}$ measured in tetralin at 135° C. of the propylene-based polymer component (A2) is less than 5 dl/g, preferably 0.7 or more and less than 5 dl/g, more preferably 0.9 to 4 dl/g.

The content of the propylene-based polymer component (A1) used in the present invention is from 0.5 to 10% by weight, preferably from 1 to 7% by weight. Herein, the total of the propylene-based polymer components (A1) and (A2) is 100% by weight. Namely, the content of the propylene-based polymer component (A2) is from 90 to 99.5% by weight, preferably from 93 to 99% by weight. When the content of the propylene-based polymer component (A1) is less than 0.5% by weight, high die swell is not obtained, and prevention of generation of a flow mark may be insufficient, and when the content of the propylene-based polymer component (A1) is over 10% by weight, the melt flow rate (MFR) of the polypropylene resin composition may lower and the flowability thereof may decrease.

From the standpoint of balance between rigidity and toughness of the polypropylene-based resin composition of the present invention, the propylene-based polymer component (A2) is preferably a composition (A2-1) having an intrinsic viscosity $[\eta]^{B}_{P}$ of less than 5 dl/g, composed of a propylene polymer component (B) having an intrinsic viscosity $[\eta]^{B}_{P}$ of 1.5 dl/g or less and a propylene-ethylene random copolymer component (C) having an intrinsic viscosity $[\eta]^C_{EP}$ of 8 dl/g or less and an ethylene content of 20 to 70% by weight;

a polypropylene-based resin composition (D)(A2-2) having an intrinsic viscosity $[\eta]^B_P$ of less than 5 dl/g, which is a propylene-ethylene block copolymer (i) composed of a propylene polymer component (B) having an intrinsic viscosity $[\eta]^B_P$ of 1.5 dl/g or less and a propylene-ethylene random copolymer component (C) having an intrinsic viscosity $[\eta]^C_{EP}$ of 8 dl/g or less and an ethylene content of 20 to 70% by weight, or a mixture (iii) of the propylene-ethylene block copolymer (i) and a propylene polymer (ii); or a composition (A2-3) having an intrinsic viscosity $[\eta]^B_P$ of less than 5 dl/g, composed of a propylene polymer component (B) and the polypropylene-based resin (D).

The compositions (A2-1), (A2-2) and (A2-3) are explained in detail below.

The composition (A2-1) is composed of the propylene polymer component (B) and a propylene-ethylene random copolymer component (C). The propylene polymer component (B) is a propylene homopolymer or a propylene-α-olefin random copolymer obtained by copolymerization of propylene and an α-olefin having 4 to 12 carbon atoms. As the α-olefin having 4 to 12 carbon atoms and propylene-α-olefin random copolymer, those listed above are specifically mentioned.

The intrinsic viscosity $[\eta]^B_P$ of the propylene polymer component (B) is preferably 1.5 dl/g or less, further preferably from 0.7 to 1.5 dl/g from the standpoints of the melt flow rate (MFR) and flowability of the polypropylene-based resin composition.

The isotactic pentad fraction measured and determined using $^{13}$C-NMR of the propylene polymer component (B) used in (A2-1) is preferably 0.95 or more, further preferably 0.97 or more from the standpoints of rigidity, heat resistance and the like.

The propylene-ethylene random copolymer component (C) is a propylene-ethylene random copolymer preferably having an ethylene unit content $[(C2')_{EP}]$ of 20 to 70% by weight, more preferably 25 to 65% by weight from the standpoint of impact resistance.

The intrinsic viscosity $[\eta]^C_{EP}$ of the propylene-ethylene random copolymer component (C) is preferably 8 dl/g or less, more preferably 6 dl/g or less, further preferably 1.5 to 4 dl/g, from the standpoints of prevention of significant generation of granular structure on a molded article.

The above-mentioned granular structure is a small block mainly composed of a propylene-ethylene random copolymer component (C), generating due to poor dispersibility of the propylene-ethylene random copolymer component (C) in a polypropylene-based resin composition, and the size thereof is about 100 to several hundreds μm. In the case of formation of a molded article by injection molding or the like using a material containing a lot of granular structures, not only the appearance of the surface of the molded article is deteriorated but also bad influences are exerted on mechanical properties such as impact resistance and the like.

Preferably, the propylene polymer component (B) is a propylene homopolymer.

The compounding ratio of (A2-1) composed of the propylene polymer component (B) and propylene-ethylene random copolymer component (C) in the polypropylene-based resin composition of the present invention is from 90 to 99.5% by weight (namely, the compounding ratio of a propylene-based polymer component (A1) is from 0.5 to 10% by weight and the total amount of (A1) and (A2-1) is 100% by weight), and the contents of component (B) and component (C) in the polypropylene-based resin composition of the present invention is preferably from 50 to 94.5% by weight and 5 to 40% by weight (herein, the total amount of the components (A1), (B) and (C) is 100% by weight), further preferably from 60 to 94.5% by weight and 5 to 30% by weight, respectively.

The polypropylene-based resin composition (D)(A2-2) is a propylene-ethylene block copolymer (i), or a mixture (iii) of the propylene-ethylene block copolymer (i) and the propylene homopolymer (ii).

The propylene-ethylene block copolymer(i) is composed of a propylene polymer portion(first segment of the (i)) and a propylene-ethylene random copolymer portion(second segment of (i)).

The propylene polymer (ii) used in the polypropylene-based resin (D) is a propylene homopolymer obtained by homo-polymerization of propylene or a propylene-α-olefin random copolymer obtained by random copolymerization of propylene and an α-olefin having 4 to 12 carbon atoms having 4 to 12 carbon atoms. As the α-olefin having 4 to 12 carbon atoms and propylene-α-olefin random copolymer, those listed above are specifically mentioned.

When the polypropylene-based resin (D)(A2-2) is a mixture (iii) of the propylene-ethylene block copolymer (i) and propylene polymer (ii), the propylene polymer component (B) of the polypropylene-based resin (D) means both the propylene polymer portion which is the first segment of the propylene-ethylene block copolymer (i), and a propylene polymer (ii); and the propylene-ethylene random copolymer component (C) of the polypropylene-based resin (D) means the propylene-ethylene random copolymer portion which is the second segment of the propylene-ethylene block copolymer (i).

As the propylene-ethylene block copolymer(i) and propylene polymer (ii) used in the polypropylene-based resin (D)(A2-2), two or more propylene-ethylene block copolymers, two or more propylene polymers, or mixtures thereof, are optionally used, respectively.

The intrinsic viscosity $[\eta]^B_P$ of the propylene polymer component (B) constituting the polypropylene-based resin (D)(A2-2) is preferably 1.5 dl/g or less, further preferably from 0.7 to 1.5 dl/g from the standpoints of the melt flow rate (MFR) and flowability of a polypropylene-based resin composition.

The propylene polymer component (B) is preferably a propylene homopolymer from the view point of rigidity and heat resistance. The isotactic pentad fraction determined using $^{13}$C-NMR of the propylene polymer component (B) constituting the polypropylene-based resin (D)(A2-2) is preferably 0.95 or more, and more preferably 0.97 or more.

The intrinsic viscosity $[\eta]^C_{EP}$ of the propylene-ethylene random copolymer component (C) used in (A2-2) constituting the polypropylene-based resin (D)(A2-2) is preferably 8 dl/g or less, more preferably 6 dl/g or less, and more preferably 1.5 to 4 dl/g, from the standpoint of prevention of significant generation of granular structures on a molded article.

The ethylene content $[(C2')_{EP}]$ in the propylene-ethylene random copolymer component (C) constituting the polypropylene-based resin (D)(A2-2) is preferably from 20 to 70% by weight, and more preferably from 25 to 65% by weight, from the standpoint of impact resistance. The balance is propylene.

Regarding the a propylene polymer component (B) and the propylene-ethylene random copolymer component (C) constituting the polypropylene-based resin (D)(A2-2), the amount of a propylene-ethylene random copolymer component (C) is preferably from 5 to 40% by weight (namely, the ratio of a propylene polymer component (B) is from 95 to 60% by weight), further preferably, the ratio of a propylene-ethylene random copolymer component (C) is from 5 to 30% by weight, (namely, the ratio of a propylene polymer component (B) is from 95 to 70% by weight), wherein the total amount of a propylene polymer component (B) and a propylene-ethylene random copolymer component (C) is 100% by weight.

(A2-3) is composed of a propylene polymer component (B) and polypropylene-based resin (D), and as the propylene polymer component (B) and the polypropylene-based resin (D), those used in the above-mentioned (A2-1) or (A2-2) are mentioned.

When (A2-3), composed of the propylene polymer component (B) and the polypropylene-based resin (D), is used in the polypropylene-based resin composition of the present invention, preferably, the amount of the propylene-based polymer component (A1) is from 0.52 to 9.8% by weight; the amount of the propylene polymer component (B) is from 0.78 to 4.2% by weight; and the amount of the polypropylene-based resin (D) is from 98.7 to 86% by weight, wherein the total amount of the components (A1), (B) and (C) is 100% by weight. Herein, component (B) is used for producing a master batch of (A1).

The melt flow rate (MFR) of the polypropylene-based resin composition of the present invention is preferably from 5 to 150 g/10 minutes, more preferably from 10 to 120 g/10 minutes, from the standpoints of moldability, prevention of generation of flow mark, or impact resistance.

The molecular weight distribution Q value measured by GPC of the polypropylene-based resin composition of the present invention is preferably less than 10, more preferably from 3 to 8, further preferably from 3 to 7 from the standpoint of tensile elongation.

The die swell (swelling ratio) of the polypropylene-based resin composition of the present invention is preferably 1.6 or more from the standpoint of suppressing flow mark generation on the surface of a molded article.

Methods of producing the polypropylene-based resin composition of the present invention is not particularly restricted, and the following methods are provided as examples:

(1) A method of separately producing (A1) and (A2), and mixing them;

(2) A method of separately producing (A1), (B) and (C), and mixing them;

(3) A method of producing (A1) and producing a propylene-based resin (D) composed of (B) and (C) by a multi-step polymerization method, and mixing (A1) and the propylene-based resin (D);

(4) A method of separately producing (A1) and a part of (B), respectively, producing a propylene-based resin (D) composed of (C) and a part of (B) by a multi-step polymerization method, and mixing (A1), a part of (B) produced separately and the propylene-based resin (D) (herein, the total amount of (B) is within the above-described range of (B) in (A2-1) or (A2-2));

(5) A method of producing the propylene-based resin composition composed of (A1), (B) and (C) by a multi-step polymerization method;

(6) A method of producing the composition (D) composed of (C) and a part of (B) by a multi-step polymerization method, producing a master batch (E) comprising (A1) and a part of (B) by a multi-step polymerization method, and mixing (D) and (E) (herein, the total amount (B) is within the above-described range of (B) in (A2-1) or (A2-2)); and (7) A method of separately producing (A1) and a part of (B), producing a master batch (E) by mixing them, producing a propylene-based resin (D) composed of a part of (B) and (C) by a multi-step polymerization method, and mixing the master batch (E) and the propylene-based resin (D) (herein, the total amount of (B) is within the above-described range of (B) in (A2-1) or (A2-2), and the (D) and (B) used for the master batch art the same as (2A-3) mentioned above).

Among the above-methods, methods (5), (6) and (7) are preferable.

Production methods of the components described above are not particularly restricted, and methods of obtaining the components according to a known polymerization method using a known polymerization catalyst are listed.

As the known polymerization catalysts, for example, catalyst systems may be prepared by combining (a) a solid catalyst component containing magnesium, titanium, halogen and an electron donor as essential components, (b) an organoaluminum compound and (c) an electron donor component as a third component.

As the catalyst system described above, for example, those described in U.S. Pat. Nos. 4,983,561, 5,608,018 and 6,187,883 can be used. Further, with respect to polymerization methods, those described in the above-described U.S. Patents can be applied.

In the method (6) or (7) described above, the method is not particularly restricted, and preferably is a method in which 98.7 to 86% by weight of the polypropylene-based resin (D) is mixed with preferably 1.3 to 14% by weight of a master batch (E), comprising preferably 40 to 70% by weight, more preferably from 45 to 65% by weight of a propylene-based polymer component (A1) and preferably 60 to 30% by weight, more preferably 35 to 55% by weight of a propylene polymer component (B) (the total amount of (A1) and (B) in the master batch (E) is 100% by weight). Regarding the compounding ratio of the polypropylene-based resin (D) to the master batch (E), more preferably, the amount of the polypropylene-based resin (D) is 98 to 88% by weight, and the amount of the propylene-based polymer composition (E) is 2 to 12% by weight. The total amount of (D) and (E) is 100% by weight.

The method of producing the master batch (E) is not particularly restricted, there are exemplified a method of mixing above-mentioned propylene- based polymer component (A1), and the propylene polymer component(B), and a multi-step polymerization method of producing the (A1) in the presence of a stereoregular polymerization catalyst system in the first step and subsequently producing the (B) in the second or the latter steps, or producing the (B) in the first step and subsequently producing the (A1) in the second or the latter steps.

More specifically, there is exemplified a method in which, in the presence of a stereoregular polymerization catalyst system composed of the above-mentioned solid catalyst component (a), organoaluminum compound (b) and electron donor component (c), at least two polymerization reactors are connected in series, and after polymerization of the component (A1), the product is transferred to the next polymerization vessel, and the propylene polymerization component (B) is continuously polymerized.

As the method of mixing the components used in the propylene-based resin composition of the present invention, for example, the polypropylene-based resin (D) and the master batch (E), there are exemplified methods using kneading machines such as a single-screw extruder, twin-screw extruder, Banbury mixer, hot roll and the like. More specifically, the following methods are mentioned.

(1) A method in which polymerization powder of the polypropylene-based resin (D) and polymerization powder of the master batch (E) are kneaded using the above-mentioned kneading machine.

(2) A method in which polymerization powder of the polypropylene-based resin (D) and polymer powder of the master batch (E) are separately individually kneaded using a single-screw extruder or twin-screw extruder to produce a pellet, thereafter, the pellet of the polypropylene-based resin (D) and the pellet of the propylene-based polymer (E) are kneaded using a single-screw extruder or twin-screw extruder.

(3) The master batch (E) previously pelletized using a single-screw extruder or twin-screw extruder is added to a kneading machine using a constant feeder and kneaded in a process of pelletizing a polymer powder of the polypropylene-based resin (D).

Preferably, in the method (2) or (3), the master batch (E) previously kneaded using a single-screw extruder or twin-screw extruder is used.

If necessary, a screen pack may be mounted on a dice of a single-screw extruder or twin-screw extruder. The screen pack to be mounted is preferably a metal fiber-sintered filter, and described, for example, in "Kikai Sekkei (Mechanical Design)" Vol. 25, No. 3, pp. 109 to 113 (March, 1981)".

The kneading temperature is usually from 170 to 250° C., preferably from 190 to 240° C.

In the polypropylene-based resin composition of the present invention, further 0 to 20% by weight of a propylene homopolymer (F), 10 to 35% by weight of an elastomer (G) and 2 to 30% by weight of an inorganic filler (H) can be added to 35 to 88% by weight of the polypropylene-based resin composition of the present invention, wherein the total amount of (F), (G), (H) and the polypropylene-based resin composition is 100% by weight.

The propylene homopolymer (F) used in the present invention is a propylene homopolymer having an intrinsic viscosity [η] measured in tetralin at 135° C. of 2 or less obtained by homo-polymerizing propylene.

The elastomer (G) used in the present invention is not particularly restricted, and preferably an elastomer containing a rubber component, and there are exemplified vinyl aromatic compound-containing rubber, ethylene-propylene random copolymer rubber, ethylene-α-olefin random copolymer rubber and elastomer composed of a mixture of them, and the like.

As vinyl aromatic compound-containing rubber used in the elastomer (G), for example, a block copolymer composed of a vinyl aromatic compound polymer block and a conjugated diene-based polymer block, and the like are listed, and the hydrogen addition ratio of double bonds at the conjugated diene portion is preferably 80% or more, more preferably 85% or more.

The molecular weight distribution (Q value) of the above-mentioned vinyl aromatic compound-containing rubber according to a GPC (gel permeation chromatography) method is preferably 2.5 or less, more preferably 2.3 or less.

The content of vinyl aromatic compounds contained in the above-mentioned vinyl aromatic compound-containing rubber is preferably from 10 to 20% by weight, more preferably from 12 to 19% by weight.

The melt flow rate (MFR, JIS-K-6758, 230° C.) of the above-mentioned vinyl aromatic compound-containing rubber is preferably from 1 to 15 g/10 minutes, more preferably from 2 to 13 g/10 minutes.

Examples of the vinyl aromatic compound-containing rubber include block copolymers such as a styrene-butadiene rubber (SBR), a styrene-butadiene- styrene rubber (SBS), a styrene-isoprene-styrene rubber (SIS) and the like, and block copolymers obtained by hydrogenating these rubbers such as a styrene-ethylene-butene-styrene rubber (SEBS), styrene-ethylene-propylene-styrene rubber (SEPS) and the like. Further, rubbers obtained by reacting a vinyl aromatic compound such as styrene or the like with ethylene-propylene- non-conjugated diene rubber (EPDM) are also listed. Still further, two or more vinyl aromatic compound-containing rubbers may also be used.

The method of producing the above-mentioned vinyl aromatic compound-containing rubber is not particularly restricted, and for example, a method in which a vinyl aromatic compound is bonded to olefin-based copolymer rubber or conjugated diene rubber by polymerization, reaction and the like, and other methods are mentioned.

The ethylene-propylene random copolymer rubber used in an elastomer (G) is random copolymer rubber of ethylene and propylene, and the molecular weight distribution (Q value) of the ethylene-propylene random copolymer rubber according to a GPC (gel permeation chromatography) method is preferably 2.7 or less, more preferably 2.5 or less.

The content of propylene contained in the above-mentioned ethylene-propylene random copolymer rubber is preferably from 20 to 30% by weight, more preferably from 22 to 28% by weight. The melt flow rate (MFR, JIS-K-6758, 190° C.) of the ethylene-propylene random copolymer rubber is preferably from 1 to 15 g/10 minutes, more preferably from 2 to 13 g/10 minutes.

The ethylene-α-olefin random copolymer rubber used as the elastomer (G) is not particularly restricted, and random copolymer rubbers composed of ethylene and an α-olefin may be permissible. This α-olefin is an α-olefin having 4 to 12 carbon atoms, and for example, 1-butene, 1-pentene, 1-hexene, 1-heptene, 1-octene, 1-decene and the like are listed, and preferable are 1-butene, 1-hexene and 1-octene.

As the ethylene-α-olefin random copolymer rubber, for example, an ethylene-1-butene random copolymer rubber, ethylene-1-hexene random copolymer rubber, ethylene-1-octene random copolymer rubber and the like are listed, and preferably is an ethylene-1-octene random copolymer rubber or ethylene-1-butene random copolymer rubber. Further, two or more ethylene-α-olefin random copolymer rubbers may also be used.

The molecular weight distribution (Q value) of the ethylene-1-octene random copolymer rubber according to a GPC (gel permeation chromatography) method is preferably 2.5 or less, more preferably 2.3 or less. The content of 1-octeneb unit in the ethylene-1-octene random copolymer rubber is preferably from 15 to 45% by weight, more preferably from 18 to 42% by weight.

The melt flow rate (MFR, JIS-K6758, 190° C.) of the above-mentioned ethylene-1-octene random copolymer rubber is preferably from 1 to 15 g/10 minutes, more preferably from 2 to 13 g/10 minutes.

The Q value of the ethylene-1-butene random copolymer rubber according to a GPC method is preferably 2.7 or less, more preferably 2.5 or less.

The content of 1-butene contained in the above-mentioned ethylene-1-butene random copolymer rubber is preferably from 15 to 35% by weight, more preferably from 17 to 3% by weight.

The melt flow rate (MFR, JIS-K-6758, 190° C.) of the above-mentioned ethylene-1-butene random copolymer rubber is preferably from 1 to 15 g/10 minutes, more preferably from 2 to 13 g/10 minutes.

The process for producing the above-mentioned ethylene-propylene random copolymer rubber and ethylene-α-olefin random copolymer rubber is not particularly restricted, and they can be produced by copolymerizing ethylene and propylene, or ethylene and the α-olefin having 4 to 12 carbon atoms, using a known catalyst by a known polymerization method. As the known catalyst, for example, catalyst systems composed of a vanadium compound and an organoaluminum compound and metallocene catalyst systems are listed, and as the known polymerization method, a solution polymerization method, slurry polymerization method, high pressure ion polymerization method and gas phase polymerization method and the like are listed.

The inorganic filler (H) optionally used in the present invention is not particularly restricted, and used usually for improving rigidity, and examples thereof include calcium carbonate, barium sulfate, mica, crystalline calcium silicate, talc, magnesium sulfate fiber and the like, and preferably are talc and magnesium sulfate fiber. These inorganic fillers may be used in combinations.

Talc used as the inorganic filler (H) is not particularly restricted, and is preferably obtained by grinding water-containing magnesium silicate. The crystal structure of the molecule of water-containing magnesium silicate is a pyrophyllite type three-layer structure, and talc is formed by lamination of this structure. Talc is particularly preferably in the form of a flat plate obtained by finely grinding a crystal of the water-containing magnesium silicate to about a unit layer.

The average particle size of talc is preferably 3 μm or less. Here, the average particle size of talc means 50% equivalent particle size $D_{50}$ obtained from an integral distribution curve of a minus mesh method measured by suspending talc in a dispersion medium such as water, alcohol or the like, using a centrifugal precipitation type particle size distribution measuring apparatus.

The above-mentioned talc may be used without treatment, alternatively, for improving dispersibility and boundary adhesion with the polypropylene-based resin composition composed of a propylene-based polymer component (A1) and a propylene-based polymer component (A2), the surface thereof may be treated with known various silane coupling agents, titanium coupling agents, higher fatty acids, higher fatty esters, higher fatty amides, higher fatty salts or other surfactants.

The magnesium sulfate fiber used as the inorganic filler (H) is not particularly restricted, and the average fiber length of the magnesium sulfate fiber is preferably from 5 to 50 μm, further preferably from 10 to 30 μm. Further, the average fiber diameter of the magnesium sulfate fiber is preferably from 0.3 to 2 μm, further preferably from 0.5 to 1 μm.

To the polypropylene-based resin composition of the present invention, various additives may be added in an amount causing no deterioration in the object and effect thereof. Examples of the additive include antioxidants, ultraviolet absorbers, lubricants, pigments, antistatic agents, copper inhibitors, flame retardants, neutralizing agent, foaming agents, plasticizers, nucleating agents, de-foaming agents, cross-linking agents and the like. For improving heat resistance, weather resistance and anti-oxidation stability, it is preferable to add an antioxidant or ultraviolet absorber.

These additives, the above-mentioned elastomer (G) and the above-mentioned inorganic filler (H) may be compounded with a pellet of a polypropylene-based resin composition previously melt-kneaded, or compounded in a stage of pelletizing a polypropylene-based resin composition.

The polypropylene-based resin composition of the present invention can be molded into an injection molded article by a known injection molding. The use of an injection molded article is particularly preferably an injection molded article for automobile, and examples thereof include a door trim, pillar, instrumental panel, bumper and the like.

EXAMPLES

The present invention is described in more detail by the following Examples and Comparative Examples below, but is not limited thereto.

The physical properties of polymers and compositions used in the Examples and Comparative Examples were measured according to the following methods.

(1) Intrinsic Viscosity (unit: dl/g)

Reduced viscosities were measured at three points of concentration of 0.1, 0.2 and 0.5 g/dl, using an Ubbellohde viscometer. The intrinsic viscosity was obtained by a calculation method described in page 491 of "Kobunshi Yoeki (Polymer Solution), Kobunshi Jikkengaku II (1982, published by Kyoritsu Shuppan K.K.)", namely, by an extrapolation method in which reduction viscosities are plotted against concentration and the concentration is extrapolated into zero. It was measured at a temperature of 135° C., using tetralin as a solvent.

(1-1) Intrinsic viscosity of propylene-ethylene block polymer (i)

(1-1a) Intrinsic viscosity of propylene homopolymer portion (first segment of the block copolymer (i)): $[\eta]_P$ As a sample, a propylene homopolymer was taken out of a polymerization reactor after polymerization in the first step, and the $[\eta]_P$ of the propylene homopolymer sample was measured.

(1-1b) Intrinsic viscosity $[\eta]_{EP}$ of propylene-ethylene random copolymer portion (second segment of block copolymer (i))

Regarding the intrinsic viscosity $[\eta]_{EP}$ of a propylene-ethylene random copolymer portion, second segment of a propylene-ethylene block copolymer (i), the intrinsic viscosity $[\eta]_P$ of a propylene homopolymer portion and the intrinsic viscosity $[\eta]_T$ of the whole propylene-ethylene block copolymer were measured respectively, and the weight ratio: X of a propylene-ethylene random copolymer portion to the whole propylene-ethylene block copolymer was used, and $[\eta]_{EP}$ was calculated according to the following formulae (weight ratio: X to the whole propylene-ethylene block copolymer was obtained by the following measuring method (2)).

$$[\eta]_{EP}=[\eta]_T/X-(1/X-1)[\eta]_P$$

$[\eta]_P$: Intrinsic viscosity (dl/g) of propylene homopolymer portion $[\eta]_T$: Intrinsic viscosity (dl/g) of the whole propylene-ethylene block copolymer (1-2) Intrinsic viscosity: $[\eta]_P$ of propylene homopolymer The intrinsic viscosity: $[\eta]_P$ of the propylene homopolymer used in a mixture (iii) was measured according to the above-mentioned method (1).

(1-3) Intrinsic viscosities $[\eta]_1$ and $[\eta]_2$ of propylene-based polymer component (A1)

The intrinsic viscosity of the propylene-based polymer obtained by one-step polymerization was measured according to the above-mentioned method (1)($[\eta]_1$). In the case of two-step polymerization, the intrinsic viscosity $[\eta]_1$ of a sample taken out of a polymerization reactor after the first polymerization step and the intrinsic viscosity $[\eta]_T$ of a final sample obtained after the second polymerization step were measured according to the method (1) described above. The intrinsic viscosity $[\eta]_2$ of a component polymerized in the second step was calculated according to the following formulae.

$$[\eta]_2 = ([\eta]_T - [\eta]_1 \times X_1)/X_2$$

$[\eta]_T$: Intrinsic viscosity (dl/g) of the final sample after two-stage polymerization process $[\eta]_1$: Intrinsic viscosity (dl/g) of the sample taken out of the polymerization reactor after first polymerization step $X_1$: weight ratio of component obtained in first step $X_2$: weight ratio of component obtained in second step $X_1$ and $X_2$ were respectively calculated from material balance in polymerization and the total of $X_1$ and $X_2$ is 1.

The weight ratio: X of a propylene-ethylene random copolymer portion to the whole propylene-ethylene block copolymer and the ethylene content: $(C_2')_{EP}$ of a propylene-ethylene random copolymer portion in a propylene-ethylene block copolymer were determined based on the report of Kakugo et al. (Macromolecules 1982, 15, 1150–1152) from a $^{13}$C-NMR spectrum measured according to the following conditions.

About 200 mg of a propylene-ethylene block copolymer was uniformly dissolved with 3 ml of orthodichlorobenzene in a 10 mm$\phi$ test tube to prepare a sample, and the $^{13}$C-NMR spectrum of this sample was measured according to the following conditions.

Measuring temperature: 135° C.

Pulse repeating time: 10 seconds

Pulse width: 45°

Accumulated frequency: 2500

(3) Isotactic Pentad Fraction

The isotactic pentad fraction means a fraction of propylene monomer unit existing at the center of the isotactic chain in pentad unit in a polypropylene molecule chain, in other words, the chain in which five propylene monomer units are successively meso-bonded, measured by a method published in A. Zambelli et al. Macromolecules, 6, 925 (1973), namely, by using $^{13}$C-NMR. The assignment of the NMR absorption peak was conducted based in Macromolecules, 8, 687 (1975) published thereafter.

Specifically, the isotactic pentad fraction was measured as an area fraction of mmmm peaks in all absorption peaks in a methyl carbon region of the $^{13}$C-NMR spectrum. When the isotactic pentad of an NPL standard substance CRM No. M19-14 Polypropylene PP MWD/2 of U.K. NATINAL PHYSICAL LABORATORY was measured by this method, it was 0.944.

(4) Comonomer Content of Propylene-based Polymer Component (A1)(unit: % by weight)

It was determined by measuring by an infrared spectrometry according to a method described in Polymer Handbook (1995, published by Kinokuniya Shoten), p. 616 and following pages.

(5) Molecular Weight Distribution (Q value, Mw/Mn)

It was measured by GPC (gel permeation chromatography) method under the following conditions.

Type: 150 CV type (Millipore Waters)

Column: Shodex M/S 80

Measuring temperature: 145° C.

Solvent: orthodichlorobenzene

Sample concentration: 5 mg/8 mL

A calibration curve was made using standard polystyrene. Mw/Mn of standard polystyrene (NBS706: Mw/Mn=2.0) measured under this condition was from 1.9 to 2.0.

(6) Melting Peak Temperature (Tm, unit: ° C.)

Using a differential scanning calorimeter (DSC-7, manufactured by Perkin Elmer), a polymer was heat-treated at 220° C. for 5 minutes, then, cooled to 150° C. at a cooling rate of 300° C. /min. and kept at 150° C. for 1 minute, further cooled to 50° C. at a cooling rate of 5° C. /min. and kept at 50° C. for 1 minute, further, heated from 50° C. to 180° C. at a heating rate of 5° C. /min, and the melting peak temperature in this operation was measured as Tm.

(7) Melt Flow Rate (MFR, unit: g/10 minutes)

It was measured according to JIS-K-6758. Unless otherwise stated, the measurement was carried out at a temperature of 230° C. under a load of 2.16 kg.

(8) Die Swell

It was measured using Capillograph 1B manufactured by Toyo Seiki Seisakusho K.K. under the following conditions.

Measuring temperature: 220° C.

L/D: 40

Shear rate: $2.432 \times 10^3$ sec$^{-1}$ (9) Number of Granular Structure (1) (unit: number/10 cm$^2$)

A film processed under the following conditions using a T die extruder was subjected to quantitative analysis according to the following method using an image analysis apparatus.

Film processing conditions:

A film having a width of 50 mm and a thickness of 50 $\mu$m was produced by an extruder V-20 manufactured by Tanabe Plastic Kikai K.K. and a film drawing apparatus.

Quantitative Analysis Method

Images (900 dpi, 8 bit) of a film were incorporated into a computer by a scanner GT-9600 manufactured by EPSON Ltd., and the images were binarized by an image analysis soft, A zo kun manufactured by Asahi Engineering Ltd. Granular structures were recognized as lighter places than surrounding places. Since the forms of granular structures are irregular, the diameter of a circle having the same area as that of a granular structure was recognized as the size of the granular structure, and the number of granular structures having a diameter of 200 $\mu$m or more per 10 cm$^2$ of a film was counted.

(10) Number of Granular Structure (2) (unit: number/43 cm$^2$)

The number of granular structures of a film was counted in the same manner as in "Number of granular structure (1)" except that the area of the film was changed from 10 cm$^2$ to 43 cm$^2$.

(11) Tensile Test (UE, unit: %)

It was measured by a method defined in ASTM D638. Measurement was conducted using a specimen having a thickness of 3.2 mm molded by injection molding. The tensile speed was 10 mm/min, 50 mm/min or 70 mm/min, and the ultimate elongation (UE) was evaluated.

(12) Flexural Modulus (FM, unit: kg/cm$^2$)

It was measured according to a method defined in JIS-K-7203. It was measured at a measuring temperature of 23° C. at a loading speed of 2.0 mm/min or 2.5 mm/min using a specimen having a thickness of 6.4 mm and a span length of 100 mm molded by injection molding.

(13) Izod Impact Strength (Izod, unit: kg.cm/cm$^2$)

It was measured according to a method defined in JIS-K-7110. It was measured at a measuring temperature of 23° C. or −30° C. using a notched specimen subjected to a notch processing after molding, having a thickness of 6.4 mm molded by injection molding.

(14) Heat Distortion Temperature (HDT, unit: ° C.)

It was measured according to a method defined in JIS-K-7207. It was measured at a fiber stress of 18.6 kg/cm$^2$ or 4.6 kg/cm$^2$.

(15) Rockwell Hardness (HR)

It was measured according to a method defined in JIS-K-7202. It was measured using a specimen having a thickness of 3.0 mm molded by injection molding. The measured value was indicated in R scale.

(16) Molded Article Appearance (Flow Mark)

A specimen of 100 mm×400 mm×3.0 mm (thickness) molded by injection molding was used, and the appearance (flow mark) thereof was observed visually, and judging between good and poor was conducted.

(17) Molded Article Appearance (Granule Structure)

A specimen of 100 mm×400 mm×3.0 mm (thickness) molded by injection molding was used, and the appearance (granule structure) thereof was observed visually.

[Production of Injection Molded Article]

(Production-1 of Injection Molded Article)

The specimens (injection molded article) for evaluation of physical properties in the above-mentioned items (11) to (15) were prepared according to the following methods.

(1a) Specimens used in Examples 1 to 16 and Comparative Examples 1 to 13

A specimen (injection molded article) was obtained by injection-molding a propylene-based resin composition at a molding temperature of 220° C., a mold cooling temperature of 50° C., an injection time of 15 seconds, and a cooling time of 30 seconds, using an injection molding machine NEOMAT350/120 type manufactured by Sumitomo Heavy Industries, Ltd.

(1b) Specimens used in Examples 17 and 18 and Comparative Examples 14 and 15

A specimen (injection molded article) was obtained by injection-molding a propylene-based resin composition at a molding temperature of 220° C., a mold cooling temperature of 50° C., an injection time of 15 seconds, and a cooling time of 30 seconds, using an injection molding machine IS150E-V type manufactured by Toshiba Machine Co., Ltd.

[Production-2 of Injection Molded Article]

The specimens for evaluation of appearance in the above-mentioned items (16) and (17) were manufactured according to the following method.

A specimen (injection molded article) was obtained by injection-molding a propylene-based resin composition at a molding temperature of 220° C., a mold cooling temperature of 50° C., an injection time of 15 seconds, and a cooling time of 30 seconds, using an injection molding machine NEOMAT515/150 type manufactured by Sumitomo Heavy Industries, Ltd.

Synthetic methods of three kinds of catalysts (solid catalyst components (I), (II) and (III)) used for polymerizing polymers used in Examples and Comparative Examples are shown below.

(1) Solid Catalyst Component (I)

A 200 liter SUS reaction vessel equipped with a stirrer was purged with nitrogen, then, 80 liters of hexane, 6.55 mol of tetrabutoxytitanium, 2.8 mol of diisobutyl phthalate and 98.9 mol of tetraethoxysilane were charged therein to form a uniform solution. Then, 51 liters of a 2.1 mol/L solution of butylmagnesium chloride in diisobutyl ether was gradually added dropwise over 5 hours while keeping the temperature in the reaction vessel at 5° C. After completion of dropping, the solution was stirred at 5° C. for 1 hour and at room temperature for 1 hour, then, the resultant was separated into solid and liquid at room temperature, and the solid was washed with 70 L of toluene three times. Subsequently, the amount of toluene was controlled so as to obtain a slurry concentration of 0.2 kg/L. Then, the slurry was stirred at 105° C. for 1 hour. Then, the slurry was cooled to 95° C., and to this was added 47.6 mol of diisobutyl phthalate, and they were reacted at 95° C. for 30 minutes. After the reaction, the resultant was separated into solid and liquid, and the solid was washed with toluene twice. Subsequently, the amount of toluene was controlled so as to obtain a slurry concentration of 0.4 kg/L, then, to this was added 3.1 mol of diisobutyl phthalate, 8.9 mol of n-dibutyl ether and 274 mol of titanium tetrachloride, and they were reacted at 105° C. for 3 hours. After completion of the reaction, the resultant was separated into solid and liquid at the same temperature. The, thus obtained solid was washed with 90 L of toluene twice at the same temperature. The amount of toluene was controlled so as to obtain a slurry concentration of 0.4 kg/L. Then, to this was added 8.9 mol of n-dibutyl ether and 137 mol of titanium tetrachloride, and they were reacted at 105° C. for 1 hour. After completion of the reaction, the solution was separated into solid and liquid at the same temperature. The thus obtained solid was washed with 90 L of toluene three times at the same temperature, then further washed with 70 L hexane three times, and then dried under reduced pressure to obtain 11.4 kg of a solid catalyst component. The solid catalyst component contained 1.83% by weight of a titanium atom, 8.4% by weight of a phthalate, 0.30% by weight of an ethoxy group, and 0.20% by weight of a butoxy group. Hereinafter, this solid catalyst component is referred to as solid catalyst component (I).

(2) Solid Catalyst Component (II)

A 200 liter SUS reaction vessel equipped with a stirrer was purged with nitrogen, and then, 80 liters of hexane, 6.55 mol of tetrabutoxytitanium, 2.8 mol of diisobutyl phthalate and 98.9 mol of tetraethoxysilane were charged therein to form a uniform solution. Then, 51 liters of a 2.1 mol/L solution of butylmagnesium chloride in diisobutyl ether was gradually added dropwise over 5 hours while keeping the temperature in the reaction vessel at 5° C. After completion of dropping, the solution was stirred for 1 hour at room temperature. Then, the resultant was separated into solid and liquid at room temperature. The thus obtained solid was washed with 70 L of toluene three times. Subsequently, the amount of toluene was controlled so as to obtain a slurry concentration of 0.6 kg/L, and then, a mixture of 8.9 mol of n-dibutyl ether and 274 mol of titanium tetrachloride was added. To this was further added 20.8 mol of phthalic chloride, and they were reacted at 110° C. for 3 hours. After completion of the reaction, the resulted solid was washed with toluene twice at 95° C. Then, the slurry concentration was controlled to 0.6 kg/L, then, to this was added 3.13 mol of diisobutyl phthalate, 8.9 mol of n-dibutyl ether and 137 mol of titanium tetrachloride, and they were reacted at 105° C. for 3 hours. After completion of the reaction, the resultant was separated into solid and liquid at the same temperature, and then, the resulted solid was washed with 90 L of toluene twice at 95° C. Subsequently, the slurry concentration was controlled to 0.6 kg/L, then, to this was added 8.9 mol of n-dibutyl ether and 137 mol of titanium tetrachloride, and they were reacted at 95° C. for 1 hour. After completion of the reaction, the solution was separated into solid and liquid at the same temperature. The resulted solid was washed with 90 L of toluene three times at the same temperature. Subsequently, the slurry concentration was controlled to 0.6 kg/L, and then, to this was added 8.9 mol of n-dibutyl ether and 137 mol of titanium tetrachloride, and they were reacted at 95° C. for 1 hour. After completion of the reaction, the resultant was separated into solid and liquid at the same temperature, and then, the resulted solid was washed with 90 L of toluene three times at the same temperature. Further, the solution was washed with 90 L of hexane three times, then dried under reduced pressure to obtain 11.0 kg of a solid catalyst component. The solid catalyst component contained 1.89% by weight of a titanium atom, 20% by weight of a magnesium atom, 8.6% by weight of a phthalate, 0.05% by weight of an ethoxy group, and 0.21% by weight of a butoxy group, and showed excellent particle properties free from fine powder. This solid catalyst component is hereinafter referred to as solid catalyst component (II).

(3) Solid Catalyst Component (III)

A 200 liter SUS reaction vessel equipped with a stirrer was purged with nitrogen, then, 80 liters of hexane, 6.55 mol of tetrabutoxytitanium, and 98.9 mol of tetraethoxysilane were charged therein to form a uniform solution. Then, 50 liters of a 2.1 mol/L solution of butylmagnesium chloride in diisobutyl ether was gradually added dropwise over 4 hours while keeping the temperature in the reaction vessel at 20° C. After completion of dropping, the solution was stirred further for 1 hour at 20° C., then, the resultant was separated into solid and liquid at room temperature, and the resulted solid was washed with 70 L of toluene three times. Subsequently, toluene was taken out so as to obtain a slurry concentration of 0.4 kg/L, then, a mixture of 8.9 mol of n-dibutyl ether and 274 mol of titanium tetrachloride was added, then, to this was further added 20.8 mol of phthalic chloride, and they were reacted at 110° C. for 3 hours. After completion of the reaction, the resulted solid was washed with toluene three times at 95° C. Then, the slurry concentration was controlled to 0.4 kg/L, then, to this was added 3.13 mol of diisobutyl phthalate, 8.9 mol of n-dibutyl ether and 109 mol of titanium tetrachloride, and they were reacted at 105° C. for 1 hour. After completion of the reaction, the resultant was separated into solid and liquid at the same temperature, and then, washed with 90 L of toluene twice at 95° C. Subsequently, the slurry concentration was controlled to 0.4 kg/L. To this was added 8.9 mol of n-dibutyl ether and 109 mol of titanium tetrachloride, and they were reacted at 95° C. for 1 hour. After completion of the reaction, the solution was separated into solid and liquid at the same temperature and then washed with 90 L of toluene twice at the same temperature. Subsequently, the slurry concentration was controlled to 0.4 kg/L, and then, to this was added 8.9 mol of n-dibutyl ether and 109 mol of titanium tetrachloride, and they were reacted at 95° C. for 1 hour. After completion of the reaction, the resultant was separated into solid and liquid at the same temperature. The resulting solid was washed with 90 L of toluene three times at the same temperature. The solution was washed with 90 L of hexane three times, and then, dried under reduced pressure to obtain 12.8 kg of a solid catalyst component. The solid catalyst component contained 2.1% by weight of a titanium atom, 18% by weight of a magnesium atom, 60% by weight of a chlorine atom, 7.15% by weight of a phthalate, 0.05% by weight of an ethoxy group, and 0.26% by weight of a butoxy group, and showed excellent particle properties free from fine powder. This solid catalyst component is hereinafter referred to as solid catalyst component (III).

[Polymerization of Polymer]

(1) Production of propylene homopolymer (HPP)

(1-1) Production of HPP-1

(1-1a) Pre-polymerization

In a 3 liter SUS autoclave equipped with a stirrer, to sufficiently dehydrated and deaerated hexane were added 25 mml/L of triethylaluminum (hereinafter, abbreviated as TEA), cyclohexylethyldimethoxysilane (hereinafter, abbreviated as CHEDMS) as an electron donor component at a ratio CHEDMS/TEA of 0.1 (mol/mol), and 15 g/L of the solid catalyst component (I), and pre-polymerization was effected while feeding propylene continuously until the concentration thereof reached 2.5 g/g solid catalyst while keeping the temperature at 15° C. or lower. The resulting prepolymer slurry was transferred to a 120 L SUS diluting vessel equipped with a stirrer, and liquid butane sufficiently purified was added to this for dilution, and the solution was stored at temperatures of 10° C. or lower.

(1-1b) Main Polymerization

In a fluidized bed reactor having a volume of 1 m$^3$ equipped with a stirrer, propylene and water were fed so as to keep a polymerization temperature of 80° C., a polymerization pressure of 1.8 MPa and a hydrogen concentration in a gas phase portion of 7 vol %, and continuous gas phase polymerization was conducted while continuously feeding 62 mmol/h of TEA, 6.2 mmol/h of CHEDMS and 1.2 g/h of the prepolymer slurry prepared in (1) as a solid catalyst component thereby obtaining a polymer at 20 kg/h. The resulting polymer has an intrinsic viscosity $[\eta]_p$ of 0.90 dl/g, and an isotactic pentad fraction of 0.97.

(1-2) Polymerization of HPP-2 to 6

Polymerization was conducted in the same manner as in HPP-1 except that the hydrogen concentration in a gas phase part and the feed amount of the solid catalyst component in the main polymerization were controlled so as to obtain polymers shown in Table 1. The analysis of the resulting polymers are shown in Table 1.

(1-3) Production of HPP-2 to HPP-6

(1-3a) Pre-polymerization

Polymerization was conducted in the same manner as in HPP-1 except that the solid catalyst component was the solid catalyst component (III) and the electron donor compound was t-butyl-n-propyldimethoxysilane (herein after, abbreviated as tBunPrDMS)

(1-3b) Main Polymerization

Main polymerization was conducted in the same manner as in HPP-1 except that the electron donor compound was tBunPrDMS, the hydrogen concentration in a gas phase part and the feeding amount of a solid catalyst component in the main polymerization were controlled so as to obtain polymers shown in Table 1. The analysis of the resulting polymers are shown in Table 1.

(2) Production of Propylene-ethylene Block Copolymer (BCPP)

(2-1) Production of BCPP-1

(2-1a) Pre-polymerization

Pre-polymerization was conducted in the same manner as in HPP-1.

(2-1b) Main Polymerization

Two fluidized bed reactors having a volume of 1 m$^3$ and equipped with a stirrer were placed in series. A propylene polymer portion was produced in the first reactor and then transferred to the second reactor without deactivating the produced polymer, and a propylene-ethylene copolymer portion was continuously produced in gas phase in the second reactor. In the first reactor in the former step, propylene and hydrogen were fed as to keep a polymerization temperature of 80° C., a polymerization pressure of 1.8 MPa and a hydrogen concentration in a gas phase portion of 7.4 vol %. Under these conditions, continuous gas phase polymerization was conducted while feeding 33 mmol/h of TEA, 3.3 mmol/h of CHEDMS and 0.8 g/h of the prepolymer slurry prepared in (1) as a solid catalyst component, thereby obtaining 18.7 kg/h of a polymer. The polymer has an intrinsic viscosity $[\eta]_P$ of 0.90 dl/g. The discharged produced polymer was fed continuously to the second reactor in the latter step. In the second reactor in the latter step, propylene, ethylene and hydrogen were continuously fed as to keep a polymerization temperature of 65° C., a polymerization pressure of 1.4 MPa, a hydrogen concentration in a gas phase portion of 4.1 vol % and an ethylene concentration of 17.2 vol %, and under this condition, continuous polymerization was continued while feeding n-propymethyldimethoxysilane at 22 mmol/h, yielding a polymer at 22.5 dl/g. The resulting polymer has an intrinsic viscosity $[\eta]_T$ of 1.07 dl/g, and the content of the polymer (EP content) produced in the latter step portion was 17% by weight. The polymer produced in the latter step portion (EP portion) has an intrinsic viscosity $[\eta]_{EP}$ of 1.9 dl/g. The ethylene content in the EP portion was 40% by weight.

(2-2) Production of BCPP-2 and BCPP-3

Polymerization was conducted in the same manner as in BCPP-1 except that the hydrogen concentration in a gas phase part, the ethylene content and the feed amount of a solid catalyst component in the main polymerization were controlled so as to obtain polymers shown in Table 2. The analysis of the resulting polymers are shown in Table 2.

(2-3) Production of BCPP-4 and BCPP-5

(2-3a) Pre-polymerization

Polymerization was conducted in the same manner as in HPP-1 except that the solid catalyst component was the solid catalyst component (III) and the electron donor compound was tBunPrDMS.

(2-3b) Main Polymerization

Main polymerization was conducted in the same manner as in BPP-1 except that the electron donor compound was tBunPrDMS, the hydrogen concentration in a gas phase part and the feeding amount of a solid catalyst component in the main polymerization were controlled so as to obtain polymers shown in Table 2. The analysis of the resulting polymers are shown in Table 2.

(2-4) Production of BCPP-6

(2-4a) Pre-polymerization

Pre-polymerization was conducted in the same manner as in HPP-1 except that the solid catalyst component was the solid catalyst component (II) and the electron donor compound was tBunPrDMS.

(2-4b) Main Polymerization

Main polymerization was conducted in the same manner as in BPP-1 except that the electron donor compound was tBunPrDMS, the hydrogen concentration in a gas phase part and the feed amount of a solid catalyst component in the main polymerization were controlled so as to obtain polymers shown in Table 2. The analysis of the resulting polymers are shown in Table 2.

$[\eta]_P$ shown in Table 1, and $[\eta]_P$, $[\eta]_{EP}$, ethylene content in EP and EP content shown in Table 2 are obtained by analyzing powders of propylene homopolymers (HPP-1 to HPP-6) and propylene-ethylene block copolymers (BCPP-1 to BCPP-3) obtained by the above-mentioned polymerization, respectively, and MFR is a MFR of a pellet prepared by adding 0.05 parts by weight of calcium stearate (manufactured by NOF Corp.), 0.05 parts by weight of 3,9-bis[2-{3-(3-t-butyl-4-hydroxy-5-methylphenyl) propionyloxy}-1,1-dimethylethyl]-2,4,8,10-tetraoxaspiro [5.5]undecane (Sumilizer GA80, manufactured by Sumitomo Chemical Co., Ltd.) and 0.05 parts by weight of bis(2,4-di-t-butylphenyl)pentaerythritol diphosphite (Ultranox U626, manufactured by GE Speciality Chemicals) as stabilizers to 100 parts by weight of a powder and granulating the mixture, using a $\phi$40 mm single-screw extruder (220° C., screen pack: 100 mesh).

(3) Production of Propylene-based Polymer Component (A1)(HMS)

(3-1) Production of HMS-1

After drying under reduced pressure, into a nitrogen-purged stainless autoclave having an inner volume of 3 liters equipped with a stirrer, was charged 5.1 mg of the above-mentioned solid catalyst component (II), 8.8 mmol of TEA and 88.1 $\mu$mol of di-t-butyldimethoxysilane as an electron donor component after they were previously allowed to contact in a heptane solution in a glass charger. Further, 50 mmHg of hydrogen and 780 g of propylene were charged into the above-mentioned autoclave and the mixture was heated up to 80° C. to initiate polymerization. Directly after raising the temperature to 80° C., an ethylene gas was continuously fed so as to give an ethylene partial pressure of 0.1 kg/m$^2$G, and polymerization was conducted for 60 minutes. 60 minutes later, the gas in the autoclave was purged, and the produced polymer was dried at 60° C. for 5 hours under reduce pressure, to obtain 198.3 g of a polymer powder. The resulting powder had an intrinsic viscosity of 7.6 (dl/g) and an ethylene content of 2.7% by weight. The melting peak temperature Tm was 148.1° C. The analysis of the resulting HMS-1 are shown in Table 3.

(3-2) Polymerization of HMS-2

Polymerization was conducted in the same manner as in HMS-1 except that the amount of the solid catalyst component (II) was changed to 5.0 mg, the hydrogen addition amount was changed to 110 mmHg and the ethylene partial pressure during polymerization was changed to 0.2 kg/m$^2$G. The amount of the resulting polymer was 410.5 g, the intrinsic viscosity was 5.8 (dl/g) and the ethylene content was 4.5% by weight. The melting peak temperature Tm was 137.5° C. The analysis of the resulting HMS-2 are shown in Table 3.

(3-3) Polymerization of HMS-3

(3-3a) Pre-polymerization

In a 3 liter SUS autoclave equipped with a stirrer, to sufficiently dehydrated and deaerated hexane, was added TEA at 25 mml/L, tBunPrDMS as an electron donor component at a ratio tBunPrDMS/TEA of 0.1 (mol/mol), and the solid catalyst component (III) at 15 g/L. -Pre-polymerization was conducted while feeding propylene continuously until the concentration thereof reached 1 g/g solid catalyst while keeping the temperature at 15° C. or lower. The resulting prepolymer slurry was transferred to a 120 L SUS diluting vessel equipped with a stirrer, and liquid butane sufficiently purified was added for dilution, and the solution was stored at temperatures of 10° C. or lower.

(3-3b) Main Polymerization

In a 300 liter SUS polymerization vessel equipped with a stirrer, liquid propylene was fed at a rate of 35 kg/h so as to keep a polymerization temperature of 60° C. and a slurry amount of 95 L. Liquid 1-butene was fed so as to keep a 1-butene concentration in a gas phase portion of 15.6 vol %, and continuous copolymerization of propylene-1-butene was conducted while feeding TEA at 31 mmol/h, tBun-PrDMS at 4.7 mmol/h and the prepolymer slurry prepared in (3-a) as a solid catalyst component at 1.3 g/h, thereby obtaining a polymer at 4.6 kg/h. The resulting polymer has an intrinsic viscosity [η] of 7.0 dl/g, a 1-butene content of 13.6% by weight, and a melting peak temperature of 152.5° C. The analysis of the resulting HMS-3 are shown in Table 3.

(3-4) Production of HMS4

(3-4a) Pre-polymerization

Pre-polymerization was conducted in the same manner as in HMS-3.

(3-4b) Main Polymerization

In a 300 liter SUS polymerization vessel equipped with a stirrer, liquid propylene was fed at a rate of 45 kg/h so as to keep a polymerization temperature of 60° C. and a slurry amount of 95 L, further, liquid 1-butene was fed so as to keep a 1-butene concentration in a gas phase portion of 5.5 vol %, and continuous copolymerization of propylene-1-butene was conducted while feeding TEA at 31 mmol/h, tBunPrDMS at 4.7 mmol/h and the previous polymer slurry prepared in (3-4a) as a solid catalyst component at 1.5 g/h thereby obtaining a polymer at 4.0 kg/h. The resulting polymer has an intrinsic viscosity [η] of 5.1 dl/g, a 1-butene content of 5.1% by weight, and a melting peak temperature of 154.0° C. The analysis of the resulting HMS-3 are shown in Table 3.

(3-5) Polymerization of HMS-5

(3-5a) Pre-polymerization

Pre-polymerization was conducted in the same manner as in HMS-3.

(3-5b) Main Polymerization

In a 300 liter SUS polymerization vessel equipped with a stirrer, liquid propylene was fed at a rate of 50 kg/h so as to keep a polymerization temperature of 60° C. and a slurry amount of 95 L, and continuous polymerization of propylene was conducted while feeding TEA at 31 mmol/h, tBunPrDMS at 4.5 mmol/h and the pre-polymer slurry prepared in (3-5a) as a solid catalyst component at 1.3 g/h, giving a polymer at 2.6 kg/h. The resulting polymer has an intrinsic viscosity [η] of 7.9 dl/g and a melting peak temperature of 164.8° C. The analysis of the resulting HMS-5 are shown in Table 3.

(3-6) Polymerization of HMS-6

(3-6a) Pre-polymerization

Pre-polymerization was conducted in the same manner as for HPP-1 except that the solid catalyst component (II) was used and tBunPrDMS was used as the electron donor compound.

(3-6b) Main Polymerization

In an SUS gas phase fluidized bed reactor having an inner volume of 1 m³ equipped with a stirrer, propylene, hydrogen and ethylene were fed so as to keep a polymerization temperature of 60° C., a polymerization pressure of 1.8 MPa, a hydrogen concentration in a gas phase portion of 0.1 vol % and an ethylene concentration in a gas phase portion of 7.3 vol %, and continuous gas phase polymerization of propylene-ethylene was conducted while feeding TEA at 60 mmol/h, tBunPrDMS at 6 mmol/h and the previous polymer slurry prepared in (3-6a) as a solid catalyst component at 0.9 g/h thereby obtaining a polymer at 22.5 kg/h. The resulting polymer has an intrinsic viscosity [η] of 5.3 dl/g, an ethylene content of 9.6% by weight and a melting peak temperature of 115.6° C. The analysis of the resulting HMS-6 are shown in Table 3.

(3-7) Production of HMS-7

(3-7a) Pre-polymerization

Pre-polymerization was conducted in the same manner as in HMS-3 except that the solid catalyst component (I) was used.

(3-7b) Main Polymerization

In a 300 liter SUS polymerization vessel equipped with a stirrer, liquid propylene was fed at a rate of 35 kg/h so as to keep a polymerization temperature of 60° C. and a slurry amount of 95 L. Ethylene was fed so as to keep an ethylene concentration in a gas phase portion of 2.9 vol %, and continuous copolymerization of propylene-ethylene was conducted in the substantial absence of hydrogen while feeding TEA at 51 mmol/h, tBunPrDMS at 5 mmol/h and the pre-polymer slurry prepared in (3-7a) as a solid catalyst component at 1.0 g/h, thereby obtaining a polymer at 6.5 kg/h. The resulting polymer was transferred continuously to a second vessel without deactivation. In the second vessel, (a SUS fluidized bed gas phase reactor having an inner volume of 1 m³ equipped with a stirrer), propylene and ethylene were fed so as to keep a polymerization temperature of 70° C., a polymerization pressure of 0.8 MPa and an ethylene concentration in a gas phase portion of 1.8 vol %, and continuous gas phase polymerization was continued using the solid catalyst component-containing polymer transferred from the first vessel in the substantial absence of hydrogen, thereby obtaining a polymer at 16.3 kg/h. The polymer had an intrinsic viscosity [η] of 8.4 dl/g, an ethylene content of 3.4% by weight and a melting peak temperature of 144.8° C. The analysis of the resulting HMS-7 are shown in Table 3.

(3-8) Production of HMS-8

(3-8a) Pre-polymerization

Pre-polymerization was conducted in the same manner as in HMS-3 except that the solid catalyst component (I) was used.

(3-8b) Main Polymerization

In a 300 liter SUS polymerization vessel equipped with a stirrer, liquefied propylene was fed at a rate of 35 kg/h so as to keep a polymerization temperature of 60° C. and a slurry amount of 95 L. Liquid 1-butene was fed so as to keep a 1-butene concentration in a gas phase portion of 10.1 vol %, and continuous copolymerization of propylene-1-butene was conducted in the substantial absence of hydrogen while feeding TEA at 53 mmol/h, tBunPrDMS at 4.7 mmol/h and the pre-polymer slurry prepared in (3-8a) as a solid catalyst component at 1.7 g/h, thereby obtaining a polymer at 4.4 kg/h. The resulting polymer has an intrinsic viscosity [η] of 8.4 dl/g, a 1-butene content of 7.4% by weight, and a melting peak temperature of 149.8° C. The analysis of the resulting HMS-8 are shown in Table 3.

(3-9) Production of HMS-9

(3-9a) Pre-polymerization

Pre-polymerization was conducted in the same manner as in HMS-3 except that the solid catalyst component (I) was used.

(3-9b) Main Polymerization

In a 300 liter SUS polymerization vessel equipped with a stirrer, liquefied propylene was fed at a rate of 35 kg/h so as to keep a polymerization temperature of 60° C. and a slurry amount of 95 L, further, ethylene was fed so as to keep an ethylene concentration in a gas phase portion of 2.8 vol %, and continuous copolymerization of propylene-ethylene was conducted in the substantial absence of hydrogen while feeding TEA at 51 mmol/h, tBunPrDMS at 5 mmol/h and the prepolymer slurry prepared in (3-9a) as a solid catalyst component at 1.0 g/h, yielding a polymer at 6.1 kg/h. The resulting polymer was transferred continuously to the second vessel without deactivation. In the second vessel, (a SUS fluidized bed gas phase reaction vessel having a content volume of 1 m³ equipped with a stirrer), propylene and ethylene were fed so as to keep a polymerization temperature of 70° C., a polymerization pressure of 1.8 MPa and an ethylene concentration in a gas phase portion of 1.9 vol %, and continuous gas phase polymerization was continued using the solid catalyst component-containing polymer transferred from the first vessel in the substantial absence of hydrogen, thereby obtaining a polymer at 15.7 kg/h. The resulting polymer corresponds to a propylene-based polymer component (A1), and has an intrinsic viscosity [η] of 8.7 dl/g, an ethylene content of 3.5% by weight, and a melting peak temperature of 144.8° C., and the analysis results are shown in Table 3. Subsequently, the resulting polymer was transferred continuously to the third vessel without deactivation. In the third vessel, (a SUS gas phase fluidized bed reaction vessel having an inner volume of 1 m$^3$ equipped with a stirrer), propylene and hydrogen were fed so as to keep a polymerization temperature of 85° C., a polymerization pressure of 1.4 MPa and a hydrogen concentration in a gas phase portion of 11.7 vol %, and continuous gas phase polymerization was continued using the polymer containing a solid catalyst component fed from the second vessel, thereby obtaining a polymer at 25.6 kg/h. The resulting polymer is HMS-9 and corresponds to the propylene-based polymer composition (E), and has an intrinsic viscosity [η] of 5.7 dl/g. From the above-mentioned results, it was determined that the ratio of the total polymerization amount of the first vessel and the second vessel to the polymerization amount of the third vessel was 61:39, and the polymer produced in the third vessel had an intrinsic viscosity [η] of 0.9 dl/g.

(3-10) Production of HMS-10

The polymerization was conducted in the same manner as in HMS-9 except that the ethylene concentration in a gas phase part and the feeding amount of a solid catalyst component in the first vessel and second vessel and the hydrogen concentration in a gas phase part in the third vessel were changed, to obtain HMS-10 corresponding to a propylene-based polymer composition (E). The polymer produced up to the second vessel corresponds to a propylene-based polymer (A1), and has an intrinsic viscosity [η] of 8.2 dl/g, an ethylene content of 2.0% by weight and a melting peak temperature of 150.8° C., and the analysis results are shown in Table 3. The ratio of the total polymerization amount of the first vessel and the second vessel to the polymerization amount of the third vessel was 60:40, and the polymer produced in the third vessel had an intrinsic viscosity [η] of 1.1 dl/g.

(3-11) Production of HMS-11

The polymerization was conducted in the same manner as for HMS-10 except that ethylene fed to the first vessel and second vessel was changed to 1-butene and the 1-butene concentration in a gas phase part and the feeding amount of a solid catalyst component were controlled, to obtain HMS-11 corresponding to a propylene-based polymer composition (E). The polymer produced up to the second vessel corresponds to a propylene-based polymer (A1), and has an intrinsic viscosity [η] of 7.6 dl/g, a 1-butene content of 6.5% by weight and a melting peak temperature of 150.7° C., and the analysis results are shown in Table 3. The ratio of the total polymerization amount of the first vessel and the second vessel to the polymerization amount of the third vessel was 47:53, and the polymer produced in the third vessel had an intrinsic viscosity [η] of 1.1 dl/g.

(3-12) Production of HMS-12

The polymerization was conducted in the same manner as in HMS-11 except that the 1-butene concentration in the gas phase portion and the feed amount of the solid catalyst component in the first vessel and second vessel were controlled, to obtain HMS-12 corresponding to a propylene-based polymer composition (E). The polymer produced up to the second vessel corresponds to a propylene-based polymer (A1) and has an intrinsic viscosity [η] of 7.3 dl/g, a 1-butene content of 8.2% by weight and a melting peak temperature of 148.0° C., and the analysis results are shown in Table 3. The ratio of the total polymerization amount of the first vessel and the second vessel to the polymerization amount of the third vessel was 45:55, and the polymer produced in the third vessel had an intrinsic viscosity [η] of 1.1 dl/g.

Example 1

0.05 parts by weight of calcium stearate (manufactured by NOF Corp.), 0.05 parts by weight of 3,9-bis[2-{3-(3-t-butyl4-hydroxy-5-methylphenyl)propionyloxy}-1,1-dimethylethyl]-2,4,8,10tetraoxaspiro[5.5]undecane (Sumilizer GA80, manufactured by Sumitomo Chemical Co., Ltd.) and 0.05 parts by weight of bis(2,4-di-t-butylphenyl)pentaerythritol diphosphite (Ultranox U626, manufactured by GE Speciality Chemicals) as stabilizers were added to 100 parts by weight of a resin composition composed of 20% by weight of a propylene homopolymer powder (HPP-5), 75% by weight of a propylene homopolymer powder (HPP-6) and 5% by weight of a propylene-based polymer powder (HMS-1). They were dry-blended blended and then granulated three times by a φ40 mm single-screw extruder (220° C., screen pack: metal fiber-sintered filter NF13D manufactured by Nippon Seisen, Ltd.), to obtain a polypropylene-based resin composition. Table 4 shows compounding ratios of the components, evaluation results of MFR, die swell of polypropylene-based resin compositions obtained by granulation, and granular structures and mechanical properties.

Examples 2 to 4

Dry blend was effected in the same manner as in Example 1 using compounding ratios of components shown in Table 4, then, granulation was conducted to obtain polypropylene-based resin compositions. The evaluation results of MFR, die swell, number-1 of granular structures and mechanical properties are shown in Table 4.

Comparative Examples 1 to 4

Dry blend was effected in the same manner as in Example 1 using compounding ratios of components shown in Table 5, then, granulation was conducted to obtain polypropylene-based resin compositions. The evaluation results of MFR, die swell, number-1 of granular structures and mechanical properties are shown in Table 5.

Example 5

0.05 parts by weight of calcium stearate (manufactured by NOF Corp.), 0.05 parts by weight of 3,9-bis[2-{3-(3-t-butyl4-hydroxy-5-methylphenyl)propionyloxy}-1,1-dimethylethyl]-2,4,8,10-tetraoxaspiro[5.5]undecane (Sumilizer GA80, manufactured by Sumitomo Chemical Co., Ltd.) and 0.05 parts by weight of bis(2,4-di-t-butylphenyl)pentaerythritol diphosphite (Ultranox U626, manufactured by GE Speciality Chemicals) as stabilizers were added to 100 parts by weight of a resin composition composed of a mixture (iii) of 65% by weight of a propylene-ethylene block copolymer (i) powder (BCPP-1) and 30% by weight of a propylene homopolymer powder (HPP-5), and 5% by weight of a propylene-based polymer component (MB-1), and they were dry-blended, then, granulated by a φ40 mm single-screw extruder (220° C., screen pack: metal fiber-sintered filter NF13D manufactured by Nippon Seisen, Ltd.), to obtain a polypropylene-based resin composition.

The above-mentioned propylene-based polymer composition (MB-1) is a propylene-based polymer composition obtained by adding 0.05 parts by weight of calcium stearate (manufactured by NOF Corp.), 0.05 parts by weight of 3,9-bis[2-{3-(3-t-butyl-4-hydroxy-5-methylphenyl) propionyloxy }-1,1-dimethylethyl]-2,4,8,10-tetraoxaspiro [5.5]undecane (Sumilizer GA80, manufactured by Sumitomo Chemical Co., Ltd.) and 0.05 parts by weight of bis(2,4-di-t-butylphenyl) pentaerythritol diphosphite (Ultranox U626, manufactured by GE Speciality Chemicals) as stabilizers to 100 parts by weight of a resin composition composed of 50% by weight of a propylene homopolymer powder (HPP-5) and 50% by weight of a propylene-based polymer powder mainly composed of propylene (HMS-7), dry-blending them, then granulation the by a φ40 mm single-screw extruder (220° C., screen pack: #100 wire mesh), and corresponds to a propylene-based polymer composition (E). Table 6 shows evaluation results of MFR, die swell and number-1 of granular structures of polypropylene-based resin compositions obtained by granulation at compounding ratios of components shown in Table 6.

Examples 6 to 14

The evaluation results of MFR, die swell and number-1 of granular structures of polypropylene-based resin compositions obtained by dry-blending in the same manner as in Example 5 at compounding ratios of components shown in Table 6 (Examples 6 to 9) or Table 7 (Examples 10 to 14) and granulating them, are shown in Table 6 (Examples 6 to 9) or Table 7 (Examples 10 to 14), respectively.

(MB-2) and (MB-3) used in Examples 6 to 9 are resin compositions shown below, and correspond to a propylene-based polymer composition (E).

(MB-2): A resin composition composed of 50% by weight of a propylene homopolymer powder (HPP-5) and 50% by weight of a propylene-based polymer powder (HMS-8).

(MB-3): A resin composition composed of 50% by weight of a propylene homopolymer powder (HPP-5) and 50% by weight of a propylene-based polymer powder (HMS-3).

The above-mentioned (MB-2) and (MB-3) were obtained by pelletizing by the same granulation method using the same stabilizers as in (MB-1) of Example 5.

Comparative Examples 5 to 12

The evaluation results of MFR, die swell and number-1 of granular structures of polypropylene-based resin compositions obtained by dry-blending in the same manner as in Example 5 at compounding ratios of components shown in Table 8 (Comparative Examples 5 to 8) or Table 9 (Comparative Examples 9 to 12) and granulating them, are shown in Table 8 (Comparative Examples 5 to 8) or Table 9 (Comparative Examples 9 to 12), respectively.

(MB4) used in Comparative Examples 5 to 8 is resin composition shown below, and correspond to a propylene-based polymer composition (E).

(MB4): A resin composition composed of 50% by weight of a propylene homopolymer powder (HPP-5) and 50% by weight of a propylene-based polymer powder (HMS-5)

The above-mentioned (MB4) was obtained by pelletizing by the same granulation method using the same stabilizers as in (MB-1) of Example 5.

Example 15

To 100 parts by weight of a resin composition composed of 60% by weight of the polypropylene-based resin composition described in Example 1, 6% by weight of a propylene homopolymer (F) powder (HPP-4), 14% by weight of an ethylene-octene-1 random copolymer (EOR) having an octene-1 content of 24% by weight and a melt flow rate (MFR, JIS-K-6758, 190° C.) of 5 g/10 minutes as an elastomer (G) and 20% by weight of talc having an average particle size of 2.5 μm as an inorganic filler (H), was added the same stabilizers as used in Example 5, and the mixture was uniformly pre-mixed in a tumbler, then, the mixture was kneaded and extruded under vent suction using a twin-screw extruder (TEX44SS 30BW-2V type, manufactured by The Japan Steel Works Ltd.) at an extrusion rate of 30 to 50 kg/hr and a screw revolution of 350 rpm, to produce a polypropylene-based resin composition. The screw was so constituted that a three-groove type rotor and a kneading disk were placed at the next zone to the first feeding port and that to the second feeding port, namely, two positions in the kneading zone.

Compounding ratios of components, and the evaluation results of MFR, die swell, flow mark, granular structure appearance and mechanical properties of the resulted polypropylene-based resin composition are shown in Table 10.

Example 16

A propylene-based resin composition was prepared in the same manner as in Example 15 except that the polypropylene-based resin composition used in Example 15 was changed to the polypropylene-based resin composition described in Example 10.

Compounding ratios of components, and the evaluation results of MFR, die swell, flow mark, granular structure appearance and mechanical properties of the resulting polypropylene-based resin composition are shown in Table 10.

Comparative Examples 13 and 14

A propylene-based resin composition was prepared in the same manner as in Example 15 except that the polypropylene-based resin composition used in Example 15 was changed to the polypropylene-based resin composition described in Comparative Example 5 or Comparative Example 9.

Compounding ratios of components, and the evaluation results of MFR, die swell, flow mark, granular structure appearance and mechanical properties of the resulted polypropylene-based resin composition are shown in Table 10.

Example 17

A resin composition was prepared in the same manner as in Example 15 except that the polypropylene-based resin composition used in Example 15 was changed to a polypropylene-based resin composition obtained by dry-blending 49% by weight of (BCPP4), 45.5% by weight of (HPP-7) and 5.5% by weight of (HMS-9) in the same manner as in Example 5, and then granulating the resulted mixture.

Compounding ratios of components, and the evaluation results of MFR, die swell, flow mark, granular structure appearance and mechanical properties of the resulting polypropylene-based resin composition are shown in Table 11.

Example 18

A composition was prepared in the same manner as in Example 15 except that 100 parts by weight of the resin composition used in Example 15 was changed to 100 parts by weight of a resin composition composed of 50 parts by weight of a polypropylene-based resin composition obtained by dry-blending 53 % by weight of (BCPP-5), 43% by weight of (HPP-8) and 4% by weight of (HMS-9) in the same manner as in Example 5 and then granulating the resulted mixture, 10 parts by weight of the propylene homopolymer (F)(HPP-4), 25 parts by weight of an ethylene-octene-1 random copolymer (EOR) having an octene-1 content of 23% by weight and a melt flow rate (MFR, JIS-K-6758, 190° C.) of 1 g/10 min. as an elastomer (G) and 15 parts by weight of talc having an average particle size of 2.5 μm as an inorganic filler (H).

Compounding ratios of components, and the evaluation results of MFR, die swell, flow mark, granular structure appearance and mechanical properties of the resulting polypropylene-based resin composition are shown in Table 11.

Example 19

A composition was prepared in the same manner as in Example 15 except that 100 parts by weight of the resin composition used in Example 15 was changed to 100 parts by weight of a resin composition composed of 75.5 parts by weight of a polypropylene-based resin composition obtained by dry-blending 96% by weight of (BCPP-6) and 4% by weight of (HMS-9) in the same manner as in Example 5 and then granulating the resulting mixture, 8.5 parts by weight of an ethylene-octene-1 random copolymer (EOR) having an octene-1 content of 24% by weight and a melt flow rate (MFR, JIS-K-6758, 190° C.) of 5g/10 min. as an elastomer (G), and 16 parts by weight of talc having an average particle size of 2.5 μm as an inorganic filler (H).

Compounding ratios of components, and the evaluation results of MFR, die swell, flow mark, granular structure appearance and mechanical properties of the resulted polypropylene-based resin composition are shown in Table 11.

TABLE 1

| | | $[\eta]_P$ dl/g | MFR g/10 minutes |
|---|---|---|---|
| Propylene homopolymer | HPP-1 | 0.90 | 140 |
| | HPP-2 | 0.84 | 195 |
| | HPP-3 | 1.48 | 11 |
| | HPP-4 | 1.21 | 29 |
| | HPP-5 | 0.92 | 120 |
| | HPP-6 | 1.34 | 17 |
| | HPP-7 | 0.95 | 100 |
| | HPP-8 | 0.80 | 267 |

TABLE 2

| | | $[\eta]_P$ dl/g | $[\eta]_{EP}$ dl/g | Ethylene content in Ep wt % | EP content wt % | MFR g/10 min. |
|---|---|---|---|---|---|---|
| Ethylene-propylene block copolymer | BCPP-1 | 0.90 | 1.9 | 40 | 17 | 68 |
| | BCPP-2 | 0.92 | 2.5 | 55 | 13 | 64 |
| | BCPP-3 | 0.81 | 2.1 | 57 | 12 | 128 |
| | BCPP-4 | 0.87 | 4.2 | 46 | 14 | 65 |
| | BCPP-5 | 0.83 | 5.1 | 41 | 14 | 68 |
| | BCPP-6 | 0.92 | 2.2 | 40 | 27 | 35 |

TABLE 3

| | | $[\eta]^{A1}$ dl/g | $Tm^{A1}$ ° C. |
|---|---|---|---|
| Propylene-based polymer component (A1) | HMS-1 | 7.6 | 148.1 |
| | HMS-2 | 5.8 | 137.5 |
| | HMS-3 | 7.0 | 152.5 |
| | HMS-4 | 5.1 | 154.0 |
| | HMS-5 | 7.9 | 164.8 |
| | HMS-6 | 5.3 | 115.6 |
| | HMS-7 | 8.4 | 144.8 |
| | HMS-8 | 8.4 | 149.8 |
| | HMS-9 | 8.7 | 144.8 |
| | HMS-10 | 8.2 | 150.8 |
| | HMS-11 | 7.6 | 150.7 |
| | HMS-12 | 7.3 | 148.0 |

TABLE 4

| | | Example | | | |
|---|---|---|---|---|---|
| | | 1 | 2 | 3 | 4 |
| Composition (wt %) | HPP-5 | 20 | 20 | | |
| | HPP-6 | 75 | 75 | 95 | 95 |
| | HMS-1 | 5 | | | |
| | HMS-2 | | 5 | | |
| | HMS-3 | | | 5 | |
| | HMS-4 | | | | 5 |
| Mw/Mn | | | | 4.0 | 3.7 |
| MFR | g/10 min. | 15 | 16 | 11 | 12 |
| Die swell | | 2.14 | 1.92 | 2.04 | 1.79 |
| UE (50 mm/minutes) | % | 739 | 637 | 725 | 733 |
| UE (70 mm/minutes) | % | 108 | 572 | 769 | 751 |
| FM (2.5 mm/minutes) | kg/cm² | 15200 | 14600 | 14700 | 14500 |
| HDT (4.6 kg/cm²) | ° C. | 118 | 111 | 117 | 120 |
| IZOD 23° C. | kg · cm/cm | 2.1 | 2.0 | 2.2 | 2.0 |
| Number-1 of granular structure number/10 cm² | | 3 | 4 | 0 | 0 |

TABLE 5

| | | Comparative example | | | |
|---|---|---|---|---|---|
| | | 1 | 2 | 3 | 4 |
| Composition (wt %) | HPP-6 | 95 | 95 | 100 | |
| | HPP-7 | | | | 100 |
| | HMS-5 | 5 | | | |
| | HMS-6 | | 5 | | |
| Mw/Mn | | 3.9 | 3.8 | 3.3 | |
| MFR | g/10 min. | 10 | 12 | 17 | 11 |
| Die swell | | 2.12 | 1.76 | 1.63 | 1.57 |
| UE (50 mm/ | % | 730 | 631 | 322 | 766 |

TABLE 5-continued

|  |  | Comparative example | | | |
|---|---|---|---|---|---|
|  |  | 1 | 2 | 3 | 4 |
| minutes) | | | | | |
| UE (70 mm/minutes) | % | 21 | 709 | 38 | 744 |
| FM (2.5 mm/minutes) | kg/cm$^2$ | 15000 | 13700 | 14800 | 14500 |
| HDT (4.6 kg/cm$^2$) | °C. | 116 | 117 | 110 | 114 |
| IZOD 23° C. | kg · cm/cm | 2.7 | 2.7 | 2.1 | 2.1 |
| Number-1 of granular structure number/10 cm$^2$ | | 0 | 0 | — | — |

TABLE 6

|  |  |  | Example | | | | |
|---|---|---|---|---|---|---|---|
|  |  |  | 5 | 6 | 7 | 8 | 9 |
| Composition (wt %) | (D) | BCPP-1 | 65 | 65 | | | |
|  |  | BCPP-2 | | | 55 | 55 | |
|  |  | BCPP-3 | | | 10 | 10 | 65 |
|  |  | HPP-5 | 30 | 30 | 30 | 27 | |
|  |  | HPP-2 | | | | | 27 |
|  | (E) | MB-1 | 5 | | | | |
|  |  | MB-2 | | 5 | | | |
|  |  | MB-3 | | | 5 | 8 | 8 |
| MFR | | g/10 minutes | 56 | 53 | 55 | 45 | 72 |
| Die swell | | | 2.13 | 2.09 | 2.05 | 2.22 | 2.28 |
| Number-1 of granular structure number/10 cm$^2$ | | | 3 | 1 | 2 | 3 | 4 |

TABLE 7

|  |  |  | Example | | | | |
|---|---|---|---|---|---|---|---|
|  |  |  | 10 | 11 | 12 | 13 | 14 |
| Composition wt % | (D) | BCPP-1 | 65 | 65 | 65 | 65 | |
|  |  | BCPP-2 | | | | | 55 |
|  |  | BCPP-3 | | | | | 15 |
|  |  | HPP-5 | 30 | 30 | 30 | 30 | 25 |
|  |  | HPP-2 | | | | | |
|  | (E) | HMS-9 | 5 | | | | 5 |
|  | wt % | HMS-10 | | 5 | | | |
|  |  | HMS-11 | | | 5 | | |
|  |  | HMS-12 | | | | 5 | |
| MFR | | g/10 minutes | 50 | 60 | 68 | 58 | 53 |
| Die swell | | | 2.15 | 2.17 | 2.13 | 2.11 | 2.21 |

TABLE 7-continued

|  |  | Example | | | | |
|---|---|---|---|---|---|---|
|  |  | 10 | 11 | 12 | 13 | 14 |
| Number-1 of granular structure number/10 cm$^2$ | | 5 | 3 | 1 | 1 | 2 |

TABLE 8

|  |  |  | Comparative Example | | | |
|---|---|---|---|---|---|---|
|  |  |  | 5 | 6 | 7 | 8 |
| Composition (wt %) | (D) | BCPP-1 | 65 | | | |
|  |  | BCPP-2 | | 55 | 55 | |
|  |  | BCPP-3 | | 10 | 10 | 65 |
|  |  | HPP-5 | 30 | 30 | 27 | |
|  |  | HPP-2 | | | | 27 |
|  | (E) | MB-4 | 5 | 5 | 8 | 8 |
| MFR | | g/10 minutes | 63 | 57 | 47 | 77 |
| Die swell | | | 2.08 | 206 | 2.32 | 2.34 |
| Number-1 of granular structure number/10 cm$^2$ | | | 8 | 26 | 15 | 8 |

TABLE 9

|  |  |  | Comparative Example | | | |
|---|---|---|---|---|---|---|
|  |  |  | 9 | 10 | 11 | 12 |
| Composition (wt %) | (D) | BCPP-1 | 65 | 65 | | |
|  |  | BCPP-2 | | | 65 | |
|  |  | BCPP-3 | | | | 65 |
|  |  | HPP-5 | 7 | | | |
|  |  | HPP-2 | 28 | | | 35 |
|  |  | HPP-1 | | 35 | 35 | |
| MFR | | g/10 minutes | 67 | 85 | 84 | 148 |
| Die swell | | | 1.39 | 1.40 | 1.37 | 1.36 |
| Number-1 of granular structure number/10 cm$^2$ | | | 0 | 1 | 1 | 0 |

TABLE 10

|  |  |  | Example | | Comparative example | |
|---|---|---|---|---|---|---|
|  |  |  | 15 | 16 | 13 | 14 |
| Composition (wt %) | Resin composition | Example 5 | 60 | | | |
|  |  | Example 10 | | 60 | | |
|  |  | Comparative Example 5 | | | 60 | |
|  |  | Comparative Example 9 | | | | 60 |
|  | (F) | HPP-4 | 6 | 6 | 6 | 6 |
|  | (G) | EOR | 14 | 14 | 14 | 14 |
|  | (H) | talc | 20 | 20 | 20 | 20 |

TABLE 10-continued

|  |  | Example | | Comparative example | |
|---|---|---|---|---|---|
|  |  | 15 | 16 | 13 | 14 |
| MFR | g/10 minutes | 28.4 | 28.2 | 29.8 | 29.3 |
| Die swell |  | 1.51 | 1.51 | 1.50 | 1.25 |
| Flow mark (visual observation) |  | good | good | good | poor |
| Granular structure on molded article (visual observation) |  | ○ | ○ | Δ | ○ |
| Number-2 (>200) of granular structure number/43 cm$^2$ |  | 0 | 0 | 4 | 0 |
| YS | kg/cm$^2$ | 241 | 244 | 245 | 238 |
| UE (10 mm/minutes) | % | 375 | 457 | 96 | 498 |
| FM (2.0 mm/minutes) | kg/cm$^2$ | 22300 | 22700 | 22700 | 22200 |
| IZOD 23° C. | kg · cm/cm | 20 | 19.9 | 17.3 | 19.9 |
| IZOD −30° C. | kg · cm/cm | 2.5 | 2.4 | 2.4 | 2.5 |
| HDT (18.6 kg/cm$^2$) | ° C. | 75 | 76 | 76 | 76 |
| HR | R scale | 72 | 72 | 73 | 74 |

Granular structure on molded article (visual observation)
○: Existence of granular structure was not recognized
Δ: Existence of granular structure was slightly recognized

TABLE 11

|  |  |  | Example | | |
|---|---|---|---|---|---|
|  |  |  | 17 | 18 | 19 |
| Composition (wt %) | Resin composition (F) | HPP-4 | 60 | 50 | 75.5 |
|  | (G) | EOR | 60 14 | 10 25 | — 8.5 |
|  | (H) | talc | 20 | 15 | 16 |
| MFR | g/10 min. |  | 30.0 | 28.7 | 23.0 |
| Die swell |  |  | 1.54 | 1.42 | 1.42 |
| Flow mark (visual observation) |  |  | good | good | good |
| Granular structure on molded article (visual observation) |  |  | ○ | ○ | ○ |
| Number-2 (>200) of granular structure number/43 cm$^2$ |  |  | 1 | 0 | 0 |
| YS | kg/cm$^2$ |  | 257 | 222 | 173 |
| UE % (10 mm/minutes) | >500 |  | >500 | >500 | >500 |
| FM (2.0 mm/minutes) | kg/cm$^2$ |  | 24600 | 17000 | 15200 |
| IZOD 23° C. | kg · cm/cm |  | 19 | 60 | 63 |
| IZOD −30° C. | kg · cm/cm |  | 2.9 | 5.9 | 5.1 |
| HDT (18.6 kg/cm$^2$) | ° C. |  | 74 | 60 | 59 |
| HR | R scale |  | 81 | 66 | 44 |

It is understood that the compositions of Examples 1 to 19 satisfy the conditions of the present invention, and when processed into a molded article, show a low tendency of generation of flow marks, namely, high die swell, have excellent appearance such as little generation of granular structure and the like, and are excellent in balance between rigidity and toughness.

On the other hand, it is understood that the composition of Comparative Example 1 shows low tensile elongation (UE) since the melting peak temperature $Tm^{A1}$ of a propylene-based polymer component (A1) does not satisfy the requirement of the invention, the composition of Comparative Example 2 shows low flexural modulus (FM) since the melting peak temperature $Tm^{A1}$ of a propylene-based polymer component (A1) does not satisfy the requirement of the invention, and the compositions of Comparative Examples 3 and 4 show low die swell and have insufficient balance between flowability (MFR) and tensile elongation (UE) since a propylene-based polymer component (A1) is not contained in the compositions.

Further, it is understood that the compositions of Comparative Examples 5 to 8 give a lot of granular structure since they do not satisfy the requirement of the invention, and the compositions of Comparative Examples 9 to 12 manifest low die swell since the propylene-based polymer component (A1) is out of the scope of the invention.

It is understood that the composition of Comparative Example 13 shows low tensile elongation (UE) since the melting peak temperature $Tm^{A1}$ of a propylene-based polymer component (A1) does not satisfy the requirement of the invention, and the composition of Comparative Example 14 shows low die swell and manifests poor flow mark appearance since the propylene-based polymer component (A1) is out of the scope of the invention.

As described in detail above, a polypropylene-based resin composition which, when made into a molded article, has a low tendency of generation of flow marks, namely, high die swell, has excellent appearance such as little generation of granular structures and the like, and is excellent in balance of rigidity and toughness, a process for producing the same and an injection molded article made of the same can be obtained according to the present invention.

What is claimed is:
1. A polypropylene-based resin composition comprising:
 0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and

90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight, wherein the polypropylene-based resin composition has a melt flow rate (MFR) measured according to JIS-K-6758 of 5 to 150 g/10 minutes.

2. The polypropylene-based resin composition according to claim 1, wherein the propylene-based polymer component (A2) comprises 50 to 94.5% by weight of a propylene polymer component (B) having an intrinsic viscosity $[\eta]^{B}_{P}$ measured in tetralin at 135° C. of 1.5 dl/g or less, and 5 to 40% by weight of a propylene-ethylene random copolymer component (C) having an intrinsic viscosity $[\eta]^{C}_{EP}$ measured in tetralin at 135° C. of 8 dl/g or less and an ethylene content of 20 to 70% by weight, wherein the total amount of (A1), (B) and (C) is 100% by weight.

3. The polypropylene-based resin composition according to claim 1, wherein the propylene-based polymer component (A2) is a polypropylene-based resin (D) having an intrinsic viscosity $[\eta]_{P}$ of less than 5 dl/g, which is a propylene-ethylene block copolymer (i) composed of a propylene polymer component (B) having an intrinsic viscosity $[\eta]^{B}_{P}$ of 1.5 dl/g or less and a propylene-ethylene random copolymer component (C) having an intrinsic viscosity $[\eta]^{C}_{EP}$ of 8 dl/g or less and an ethylene content of 20 to 70% by weight, or a mixture(iii) of the propylene-ethylene block copolymer (i) and a propylene polymer (ii).

4. The polypropylene-based resin composition according to claim 1, wherein the content of the propylene-based polymer component (A1) is from 0.52 to 9.8% by weight and the propylene-based polymer component (A2) is composed of 0.78 to 4.2% by weight of the a propylene polymer component (B) and 98.7 to 86% by weight of a polypropylene-based resin (D) having an intrinsic viscosity $[\eta]^{B}_{P}$ of less than 5 dl/g, which is a propylene-ethylene block copolymer (i) composed of a propylene polymer component (B) having an intrinsic viscosity $[\eta]^{B}_{P}$ of 1.5 dl/g or less and a propylene-ethylene random copolymer component (C) having an intrinsic viscosity $[\eta]^{C}_{EP}$ of 8 dl/g or less and an ethylene content of 20 to 70% by weight, or a mixture(iii) of the propylene-ethylene block copolymer (i) and a propylene polymer (ii), and wherein the total amount of (A1), (B) and (D) is 100% by weight.

5. A polypropylene-based resin composition comprising:
0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and
90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight, wherein the propylene-based polymer component (A1) has an intrinsic viscosity $[\eta]^{A1}$ measured in tetralin at 135° C. of 6 to 9 dl/g and a melting temperature peak $Tm^{A1}$ measured by a differential scanning calorimeter of 135 to 155° C.

6. The polypropylene-based resin composition according to claim 1, wherein the propylene-based polymer component (A1) is a random copolymer of propylene and ethylene, having an ethylene content of 1 to 7% by weight.

7. The polypropylene-based resin composition according to claim 2, wherein the propylene polymer component (B) has an intrinsic viscosity $[\eta]^{B}_{P}$ measured in tetralin at 135° C. of 0.7 to 1.5 dl/g and the propylene-ethylene random copolymer component (C) has an intrinsic viscosity $[\eta]^{C}_{EP}$ measured in tetralin at 135° C. of 1.5 to 4 dl/g.

8. The polypropylene-based resin composition according to claim 3, wherein the propylene polymer component (B) has an intrinsic viscosity $[\eta]^{B}_{P}$ measured in tetralin at 135° C. of 0.7 to 1.5 dl/g and the propylene-ethylene random copolymer component (C) has an intrinsic viscosity $[\eta]^{C}_{EP}$ measured in tetralin at 135° C. of 1.5 to 4 dl/g.

9. A polypropylene-based resin composition comprising:
0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and
90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight, wherein the polypropylene-based resin composition has a molecular weight distribution Q value (Mw/Mn) measured by a gel permeation chromatography method of less than 10.

10. A polypropylene-based resin composition comprising:
0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and
90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight, wherein the polypropylene-based resin composition has a die swell of 1.6 or more.

11. A polypropylene-based resin composition comprising:
35 to 88% by weight of a polypropylene-based resin composition comprising:
0.5 to 10% by weight of a proylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and 90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight,
0 to 20% by weight of a propylene homopolymer (F),
10 to 35% by weight of an elastomer (G), and
2 to 30% by weight of an inorganic filler(H).

12. An injection molded article made of a polypropylene-based resin composition comprising:
0.5 to 10% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.; and 90 to 99.5% by weight of a propylene-based polymer component (A2) obtained by polymerizing a monomer mainly composed of propylene, having an intrinsic viscosity $[\eta]^{A2}$ measured in tetralin at 135° C. of less than 5 dl/g, wherein the total amount of (A1) and (A2) is 100% by weight, wherein the polypropylene-based resin composition has a melt flow rate (MFR) measured according to JIS-K-6758 of 5 to 150 g/10 minutes.

13. A process for producing a polypropylene-based resin composition, comprising mixing 98.7 to 86% by weight of a polypropylene-based resin(D) with 1.3 to 14% by weight of a master batch(E) comprising 40 to 70% by weight of a propylene-based polymer component (A1) and 60 to 30% by weight of a propylene polymer component (B), wherein the propylene-based resin (D) has an intrinsic viscosity $[\eta]_P$ of less than 5 dl/g and is a propylene-ethylene block copolymer (i) composed of a propylene polymer component (B) having an intrinsic viscosity $[\eta]^B_P$ of 1.5 dl/g or less and a propylene-ethylene random copolymer component (C) having an intrinsic viscosity $[\eta]^C_{EP}$ of 8 dl/g or less and an ethylene content of 20 to 70% by weight, or a mixture(iii) of the propylene-ethylene block copolymer (i) and a propylene polymer (ii), wherein the propylene-based polymer component (A1) is a component obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C.

14. A master batch comprising 40 to 70% by weight of a propylene-based polymer component (A1) obtained by polymerizing a monomer mainly composed of propylene, having an intrinsic viscosity $[\eta]^{A1}$ measured in tetralin at 135° C. of 5 dl/g or more and a melting peak temperature $Tm^{A1}$ measured by a differential scanning calorimeter of 130 to 160° C. and 60 to 30% by weight of propylene polymer component (B) having an intrinsic viscosity $[\eta]^B_P$ measured in tetralin at 135° C. of 1.5 dl/g or less.

* * * * *